(12) United States Patent
Keinert et al.

(10) Patent No.: US 10,944,972 B2
(45) Date of Patent: Mar. 9, 2021

(54) APPARATUS AND METHOD FOR ENCODING OR DECODING USING A SUBBAND DEPENDENT PREDICTION ADAPTATION FOR GCLI ENTROPY CODING

(71) Applicants: FRAUNHOFER-GESELLSCHAFT ZUR FOERDERUNG DER ANGEWANDTEN FORSCHUNG E.V., Munich (DE); intoPIX SA, Mont-Saint-Guibert (BE)

(72) Inventors: Joachim Keinert, Nuremberg (DE); Charles Daniel Buysschaert, Mont-Saint-Guibert (BE); Valentin Dessy, Mont-Saint-Guibert (BE); Miguel Angel Martinez Del Amor, La Algaba (ES); Pascal Hubert Pellegrin, Mont-Saint-Guibert (BE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/433,248

(22) Filed: Jun. 6, 2019

(65) Prior Publication Data
US 2019/0289295 A1    Sep. 19, 2019

Related U.S. Application Data

(63) Continuation of application No. PCT/EP2017/083334, filed on Dec. 18, 2017.

(30) Foreign Application Priority Data

Dec. 19, 2016    (EP) .................................... 16205187

(51) Int. Cl.
*H04N 19/132*    (2014.01)
*H04N 19/18*    (2014.01)
(Continued)

(52) U.S. Cl.
CPC .......... *H04N 19/132* (2014.11); *H04N 19/11* (2014.11); *H04N 19/15* (2014.11); *H04N 19/167* (2014.11);
(Continued)

(58) Field of Classification Search
CPC .... H04N 19/91; H04N 19/124; H04N 19/645; H04N 19/132
See application file for complete search history.

(56) References Cited

U.S. PATENT DOCUMENTS 9,332,258 B2    5/2016 Pellegrin et al.
2014/0247999 A1*    9/2014 Pellegrin ................ H04N 19/91
382/232
(Continued)

FOREIGN PATENT DOCUMENTS

EP    2773122 A1    9/2014
JP    2011071649 A    4/2011
(Continued)

OTHER PUBLICATIONS

IntoPIX codec submission; 2016 (Year: 2016).*
(Continued)

Primary Examiner — Luis Perez-Fuentes
(74) Attorney, Agent, or Firm — Perry + Currier

(57) ABSTRACT

An apparatus for encoding image data, the image data being decomposed into a plurality of different subbands, each subband having a plurality of coefficients, wherein a precinct has different sets of coefficients from different subbands, wherein two sets of coefficients of a first precinct belong to a first spatial region of an image represented by the image
(Continued)

data, the apparatus having: a processor for determining, for each group of coefficients within a set, a greatest coded line index (GCLI); an encoder for encoding the greatest coded line indices associated with a first set of the first precinct in accordance with a first encoding mode, and for encoding the greatest coded line indices associated with a second set of the first precinct in accordance with a second encoding mode, the second encoding mode being different from the first encoding mode; and an output interface for outputting an encoded image signal having data on the encoded greatest coded line indices and data on the coefficients.

42 Claims, 18 Drawing Sheets

(51) Int. Cl.
    *H04N 19/645*     (2014.01)
    *H04N 19/11*     (2014.01)
    *H04N 19/15*     (2014.01)
    *H04N 19/167*     (2014.01)
    *H04N 19/64*     (2014.01)
    *H04N 19/169*     (2014.01)

(52) U.S. Cl.
    CPC .......... *H04N 19/18* (2014.11); *H04N 19/645* (2014.11); *H04N 19/1883* (2014.11); *H04N 19/647* (2014.11)

(56) References Cited

U.S. PATENT DOCUMENTS

| | | | |
|---|---|---|---|
| 2017/0223354 A1* | 8/2017 | Rouvroy | H04N 19/91 |
| 2018/0192051 A1* | 7/2018 | Dessy | H04N 19/12 |
| 2019/0289295 A1* | 9/2019 | Keinert | H04N 19/645 |
| 2020/0014956 A1 | 1/2020 | Rosewarne et al. | |
| 2020/0226791 A1* | 7/2020 | Pellegrin | G06T 3/4084 |

FOREIGN PATENT DOCUMENTS

| | | |
|---|---|---|
| JP | 2016163278 A | 9/2016 |
| WO | WO-2018165695 A | 9/2018 |

OTHER PUBLICATIONS

NPL—IntoPIX codec submission; 2016. (Year: 2016).*
NPL Google Search; 2020 (Year: 2020).*
Lorent, Jean-Baptiste, and Rue Emile Francqui. "TICO Lightweight Codec Used in IP Networked or in SDI Infrastructure." SMPTE RDD 35 (2016).
Kojima, Toshiaki. "LLVC—Low Latency Video Codec for Network Transfer." SMPTE RDD 34 (2015).
Kim, Jaemoon, and Chong-Min Kyung. "A lossless embedded compression using significant bit truncation for HD video coding." IEEE Transactions on Circuits and Systems for video technology 20.6 (2010): 848-860.
Pellegrin, P., (Ed.) et al., "JPEG XS GCLI Bounded code proposal," ISO/IEC JTC1/SC29/WG1 (ITU-T SG16) Coding of Still Pictures, 76th Meeting—Torino, IT, Jul. 10, 2017.
ISA/EP, International Preliminary Report on Patentability, dated Mar. 1, 2019, re PCT International Patent Application No. PCT/EP2017/083334.
ISA/EP, International Search Report and Written Opinion, dated Feb. 19, 2019, re PCT International Patent Application No. PCT/EP2017/083334.
IntoPIX: "intoPIX Codec Submission for JPEG-XS CfP, Design description V0.1", 73. JPEG Meeting; Oct. 14, 2016-Oct. 21, 2016; Chengdu; (Joint Picture Expert Group or ISO/IEC JTC1/SC29/WG1), No. wg1m73019, Sep. 23, 2016.
Descampe, A.: "JPEG XS Core Experiments #1", 73. JPEG Meeting; Oct. 14, 2016-Oct. 21, 2016; Chengdu; (Joint Picture Expert Group or ISO/IEC JTC1/SC29/WG1), No. wg1n73017, Dec. 2, 2016.
Canon Information Systems Research Australia: "GCLI prediction mode selection at the sub-band level", 75. JPEG Meeting; Mar. 26, 2017-Mar. 31, 2017; Sydney; (Joint Picture Expert Group or ISO/IEC JTC1/SC29/WG1), No. wg1m75033, Mar. 24, 2017.
Richter, Thomas, et al. "High speed, low-complexity image coding for IP-transport with JPEG XS." Applications of Digital Image Processing XXXIX. vol. 9971. International Society for Optics and Photonics, 2016.

* cited by examiner

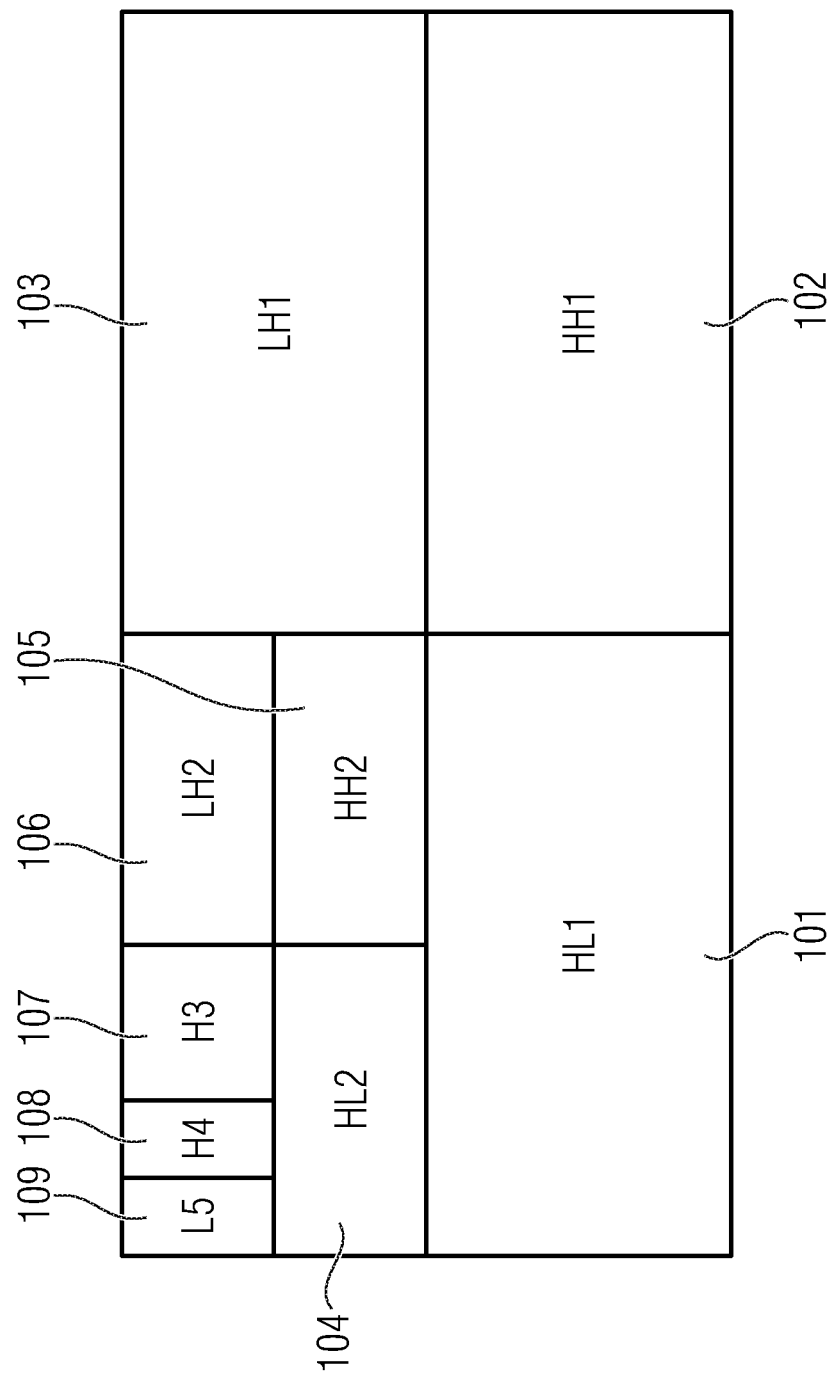

ENCODER: Horizontal / Vertical Prediction $$\delta = \begin{cases} \max(GCLI(F_2), GTLI(F_2)) - \max(GCLI(F_1), GTLI(F_2)) & \text{if } GCLI(F_1) > GTLI(F_1) \\ \max(GCLI(F_2), GTLI(F_2)) - GTLI(F_2) & \text{otherwise} \end{cases}$$

Fig. 2b

DECODER: Horizontal / Vertical Prediction $$GCLI'(F_2) = \delta + \begin{cases} \max(GCLI(F_1), GTLI(F_2)) & \text{if } GCLI(F_1) > GTLI(F_1) \\ GTLI(F_2) & \text{otherwise} \end{cases}$$

Fig. 2c

RAW Mode: $\max(GCLI(F_1) - GTLI(F_1), 0)$

Fig. 2d

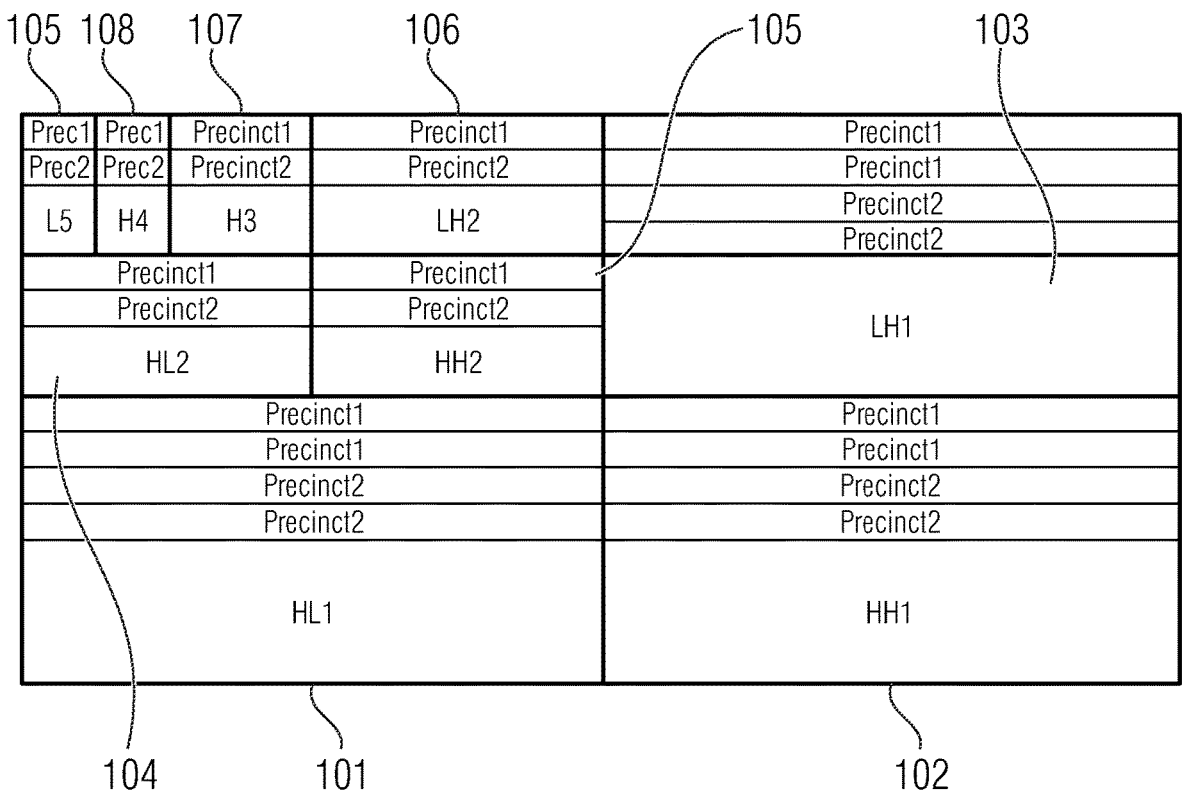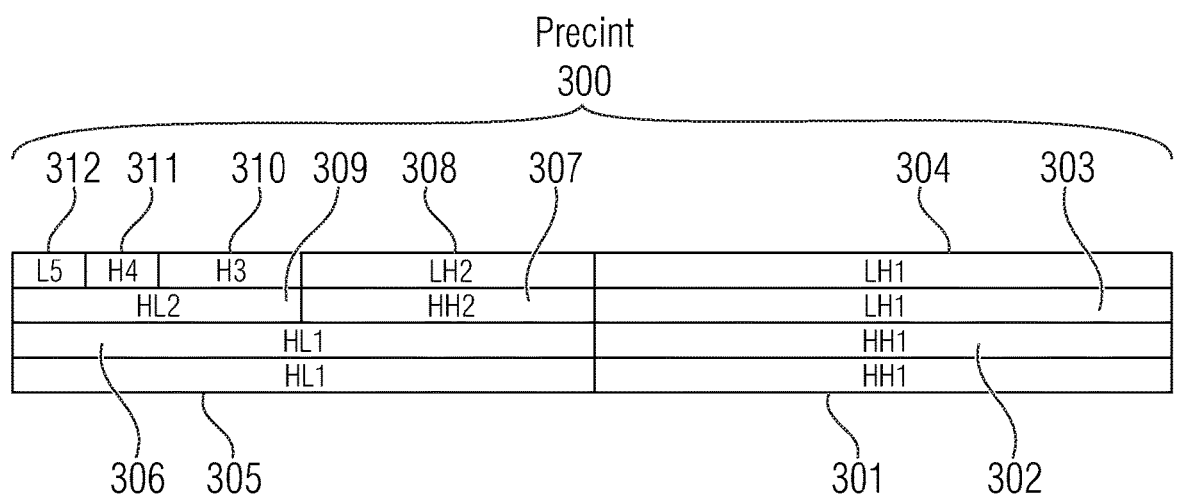
spatial area has e.g.
- two lines height
- same width as image
- e.g. 3840 columns
Fig. 3

Fig. 13 (ENCODER)

Fig. 14 (DECODER)

__(1)__

APPARATUS AND METHOD FOR ENCODING OR DECODING USING A SUBBAND DEPENDENT PREDICTION ADAPTATION FOR GCLI ENTROPY CODING

CROSS-REFERENCE TO RELATED APPLICATIONS

This is a continuation of copending International Application No. PCT/EP2017/083334, filed Dec. 18, 2017, which is incorporated herein by reference in its entirety, and additionally claims priority from European Application No. 16205187.4, filed Dec. 19, 2016, which is also incorporated herein by reference in its entirety.

BACKGROUND OF THE INVENTION

The present invention is related to image coding and, particularly, to image coding relying on a greatest common line index (GCLI) entropy coding.

1.1 Image Transform

Image and video compression typically applies a transform before running entropy coding. Reference [5], for instance, uses a block based prediction, while references [1][2][3][4] advocate for wavelet transforms.

Such a wavelet transform is depicted in FIG. 1. It decomposes an image into a number of subbands. As depicted in FIG. 1, the number of horizontal decompositions might be different from the number of vertical decompositions. In each decomposition step, the lowpass subband of the previous decomposition is further decomposed. The L5 subband represents a subsampled version of the image, while the other subbands contain the detail-information.

After the frequency transform, the coefficients of the subbands are entropy-coded. In other words, $g>1$ coefficients of a subband ABm, with $A,B \in \{L, H\}$, $m \in \mathbb{N}$ are formed to a coefficient group. Then the number of remaining bit-planes is signaled, followed by the raw data bits. More details on the coding technique are explained in the following section.

FIG. 1 illustrates a specific exemplary wavelet transform of an image. In this example, two vertical and four horizontal decompositions are assumed.

Particularly, a first subband is subband HL1 101 that results from a high pass filtering in the vertical or y direction and a low pass filtering in the horizontal or x direction. Subband 102 indicated as HH1 results from high pass filtering actions in both the vertical and the horizontal directions. Furthermore, subband LH1 indicated at 103 results from vertical low pass filtering and horizontal high pass filtering of the subband resulting from lowpass filtering of the image. Furthermore, subband 105 indicated at HH2 results from vertical and horizontal high pass filtering actions of the subband resulting from lowpass filtering of the image.

Furthermore, subband 104 indicated at HL2 results from vertical high pass filtering and horizontal low pass filtering of the subband resulting from lowpass filtering of the image. Subband 106 indicated at LH2 results from vertical low pass filtering and horizontal high pass filtering of the subband resulting from lowpass filtering of the image. Analogously, subband 107 results from horizontal high pass filtering of a subband generated by two low pass filterings in both horizontal and vertical directions, and subband 108 indicated at H4 results from vertical high pass filtering of a subband generated by two low pass filterings in vertical direction and three low pass filterings in horizontal direction, and subband 109 illustrates the approximated low pass image.

FIG. 2a illustrates the principle of GCLI coding where a group of coefficients is formed by four values, where each value is represented by a certain number of bit-planes such as eight bit-planes and a sign bit indicated at s0, s1, s2, s3. Naturally, any other group of coefficients can be formed such as a group having only two or only three or even more than four coefficients. Furthermore, there does exist a single coefficient for each position in each subband 101 to 109 for each color. Thus, since a three-color representation is used, three coefficients exist for each position in each of the subbands illustrated in FIG. 1.

1.2 Coding Principle

FIG. 2a illustrates the principle of the GCLI coding. A number of coefficients (being larger than one), belonging to the same subband of a frequency transform, are combined to a group. These coefficients are represented in sign-magnitude representation. The largest coefficient in the group determines the number of active bit-planes. A bit-plane is called active, if at least one coefficient bit of the bit-plane itself or any previous—that is more significant—bit-plane is unequal to zero. The number of active bit-planes is given by the so-called GCLI value (greatest coded line index). A GCLI value of zero means that no bit-planes are active, and hence the complete coefficient group is zero.

For lossy encoding, some of the bit-planes might be truncated. This corresponds to a quantization with a factor being a power of two. The quantization is specified by the so-called GTLI (Greatest Trimmed Line Index). A GTLI of zero corresponds to no quantization. The active bit-planes remaining after quantization are called remaining bit-planes in the following. Moreover, the GTLI is also called truncation point in the following.

These remaining bit-planes are then transmitted as raw bits to the decoder. In order to enable correct decoding, the decoder needs to know the number of remaining/transmitted bit-planes for every group of coefficients. Consequently, they need to be signaled to the decoder as well. This is done by a variable length code that represents the difference to the number of remaining bit-planes of a previous coefficient group. This previous coefficient group can in principle be any coefficient group that the encoder has already encoded before. Hence, it can for instance be a horizontal or a vertical neighbor group.

The method described below is agnostic to the transmission order of the different bit-stream parts. For instance, it is possible to first place the GCLI coefficients of all subbands into the bitstream, followed by the data bits of all subbands. Alternatively, GCLI and data bits might be interleaved.

1.3 Coefficient Organization

The coefficients of the frequency transform depicted in FIG. 1 are organized in so-called precincts as depicted in FIG. 3. Precincts group coefficients of different subbands belonging to the same spatial region in the input image.

The upper portion of FIG. 3 illustrates the distribution of the individual precincts 1, 2, . . . within the individual subbands 101 to 109 illustrated in FIG. 1. Typically, a precinct defines a spatial area that has, for example, a height of two lines that has the same width as the image and consists of, for example, 3840 columns. Naturally, a precinct can also include other heights of lines such as three or four or even more line heights and more or less columns. A number of lines that can be divided by two is, however, of advantage.

Particularly, the precinct has the first two lines of HH1 indicated at 301 and 302 and the first two lines of LH1 indicated at 303, 304. Furthermore, the precinct has the first two lines of HL1 indicated at 305 and 306 and a single line of HL2 indicated at 309, a single line of HH2 indicated at 307, a single line of LH2 indicated at 308, a single line of H3 indicated at 310, a single line of H4 indicated at 311 and a single line of L5 indicated at 312. The final number of precincts that are used for a picture depends on the number of lines of the picture and how many lines are included within a precinct.

1.4 Prediction Schemes

In order to enable the decoder to recover the signal, it needs to know the GCLI value for every coefficient group. Different methods are available in the state of the art [2] to signal them efficiently.

1.4.1 RAW Mode

In the RAW mode, the GCLI value is transmitted without any prediction or by predicting it from zero. Hence, let $F_1$ be the coefficient group to be encoded next. Then the GCLI value can be encoded by a the following prediction residual:

$$\delta = \max(GCLI(F_1) - GTLI(F_1), 0)$$

For this value, two different codes can be used. The first one is transmitting the S value as a fixed length binary code where one example is illustrated in the following table.

| Prediction residual δ | Coded value |
|---|---|
| 0 | 0000 |
| 1 | 0001 |
| 2 | 0010 |
| 3 | 0011 |
| ... | ... |

The second code is a variable length unsigned unary code depicted in the following table and also described in [7] as GCLI unsigned unary coding without prediction.

| Prediction residual δ | Coded value |
|---|---|
| 0 | 0 |
| 1 | 10 |
| 2 | 110 |
| 3 | 1110 |
| ... | ... |

In an alternative embodiment, an alternative code can be constructed by replacing 0 with 1 and vice versa in the above table.

1.4.2 Horizontal Prediction

Let $F_1$ and $F_2$ be two horizontally neighbored coefficient groups, consisting of g>1 coefficients. Let $F_2$ be the coefficient group to be currently coded. Then $GCLI(F_2)$ can be signaled to the decoder by transmitting $$\delta = \begin{cases} \max(GCLI(F_2), GTLI(F_2)) - \max(GCLI(F_1), GTLI(F_2)) & \text{if } GCLI(F_1) > GTLI(F_1) \\ \max(GCLI(F_2), GTLI(F_2)) - GTLI(F_2) & \text{otherwise} \end{cases}$$

The decoder recovers $GCLI(F_2)$ by computing $$GCLI'(F_2) = \delta + \begin{cases} \max(GCLI(F_1), GTLI(F_2)) & \text{if } GCLI(F_1) > GTLI(F_1) \\ GTLI(F_2) & \text{otherwise} \end{cases}$$

$$GCLI(F_2) = \begin{cases} GCLI'(F_2) & \text{if } GCLI'(F_2) > GTLI(F_2) \\ 0 & \text{otherwise} \end{cases}$$

In horizontal prediction, typically $GTLI(F_1) = GTLI(F_2)$ is valid, and δ is typically transmitted as a variable length code.

Essentially, this means that $$\delta = \max(GCLI(F_2), GTLI(F_2)) - \max(GCLI(F_1), GTLI(F_2))$$

1.4.3 Vertical Prediction

Let $F_1$ and $F_2$ be two vertically neighbored coefficient groups, consisting of g>1 coefficients. Let $F_2$ be the coefficient group to be currently coded.

The $GCLI(F_2)$ can be encoded in the same way than in Section 1.4.2.

In an alternative embodiment, the following prediction formula can be used for vertical prediction:

$$\delta = \max(GCLI(F_2), GTLI(F_2)) - \max(GCLI(F_1), \max(GTLI(F_1), GTLI(F_2)))$$

The decoder then recovers $GCLI(F_2)$ by computing $$GCLI'(F_2) = \delta + \max(GCLI(F_1), \max(GTLI(F_1), GTLI(F_2)))$$

$$GCLI(F_2) = \begin{cases} GCLI'(F_2) & \text{if } GCLI'(F_2) > GTLI(F_2) \\ 0 & \text{otherwise} \end{cases}$$

1.5 Coding Modes

In addition to the prediction modes, different coding modes can be used. Reference [6], for instances proposes a method to compress zero GCLIs more efficiently. To this end, for every group of eight GCLIs a single bit flag indicates whether the GCLI group is zero or not. Zero GCLI groups are not further encoded, while non-zero GCLI groups are encoded as described in Section 1.4.2.

In the following, coding modes are simply considered as additional prediction modes for reasons of simplicity.

Exemplary equations for the calculation of the different coding modes are illustrated in FIG. 2b for the horizontal or vertical prediction mode with respect to the encoder-side. Furthermore, FIG. 2c illustrates exemplary equations for the horizontal/vertical prediction mode performed at the decoder-side, and FIG. 2d illustrates the functionality of the raw mode.

In the state of the art [2], the prediction method to use is selected on a precinct base. In other words, the GCLI values of all subbands of the precinct are predicted by the same scheme. This, however, does not leverage the full potential of the codec.

SUMMARY

According to an embodiment, an apparatus for encoding image data, the image data being decomposed into a plurality of different subbands, each subband having a plurality of coefficients, wherein a first subband of the plurality of different subbands has a first set of coefficients, wherein a different second subband of the plurality of different subbands has a different second set of coefficients, wherein a precinct has the first and the second sets of coefficients from the first and the second subbands of the plurality of different subbands, wherein the first and the second sets of coefficients of the precinct belong to a spatial region of an image represented by the image data, may have: a processor for determining, for each group of coefficients within a set, a greatest coded line index (GCLI); an encoder for encoding the greatest coded line indices associated with the first set of coefficients of the precinct in accordance with a first encoding mode, and for encoding the greatest coded line indices associated with the second set of coefficients of the precinct in accordance with a second encoding mode, the second encoding mode being different from the first encoding mode; and an output interface for outputting an encoded image signal having data on the encoded greatest coded line indices and data on the coefficients, wherein the first encoding mode and the second encoding mode are selected from a set of encoding modes having at least two of: a vertical prediction encoding mode, a horizontal prediction encoding mode, and a raw encoding mode.

According to another embodiment, an apparatus for decoding an encoded image signal having data on encoded greatest coded line indices and data on coefficients may have: a decoding mode determiner for determining different decoding modes for the data on the encoded greatest coded line indices for different subbands within a precinct, wherein the data on the coefficients represent image data being decomposed into a plurality of different subbands, each subband having a plurality of coefficients, wherein the precinct has different sets of coefficients from different subbands, wherein two sets of coefficients of a precinct belong to a spatial region of an image represented by the image data; and a decoder for decoding the data on the encoded greatest coded line indices for the first set in the precinct using the first decoding mode and for decoding the data on the encoded greatest coded line indices for the second set in the precinct using a second decoding mode as determined by the decoding mode determiner, and for decoding the data on the coefficients using decoded greatest coded line index data, wherein the first decoding mode and the second decoding mode are selected from a group of decoding modes having at least two of a vertical inverse prediction decoding mode, a horizontal inverse prediction decoding mode, and a raw decoding mode.

According to another embodiment, a method for encoding image data, the image data being decomposed into a plurality of different subbands, each subband having a plurality of coefficients, wherein a first subband of the plurality of different subbands has a first set of coefficients, wherein a different second subband of the plurality of different subbands has a different second set of coefficients, wherein a precinct has the first and the second sets of coefficients from the first and the second subbands of the plurality of different subbands, wherein the first and the second sets of coefficients of the precinct belong to a spatial region of an image represented by the image data, my have the steps of: determining, for each group of coefficients within a set, a greatest coded line index (GCLI); encoding the greatest coded line indices associated with the first set of coefficients of the precinct in accordance with a first encoding mode, and encoding the greatest coded line indices associated with the second set of coefficients of the precinct in accordance with a second encoding mode, the second encoding mode being different from the first encoding mode; and outputting or storing an encoded image signal having data on the encoded greatest coded line indices and data on the coefficients, wherein the first encoding mode and the second encoding mode are selected from a set of encoding modes having at least two of: a vertical prediction encoding mode, a horizontal prediction encoding mode, and a raw encoding mode.

According to still another embodiment, a method for decoding an encoded image signal having data on encoded greatest coded line indices and data on coefficients may have the steps of: determining different decoding modes for the data on the encoded greatest coded line indices for different subbands within a precinct, wherein the data on the coefficients represent image data being decomposed into a plurality of different subbands, each subband having a plurality of coefficients, wherein the precinct has different sets of coefficients from different subbands, wherein two sets of coefficients of a precinct belong to a spatial region of an image represented by the image data; and decoding the data on the encoded greatest coded line indices for the first set in the precinct using the first decoding mode and decoding the data on the encoded greatest coded line indices for the second set in the precinct using a second decoding mode as determined by the determining the different decoding modes, and decoding the data on the coefficients using decoded greatest coded line index data, wherein the first decoding mode and the second decoding mode are selected from a group of decoding modes having at least two of a vertical inverse prediction decoding mode, a horizontal inverse prediction decoding mode, and a raw decoding mode.

Another embodiment may have an encoded image signal having data on encoded greatest coded line indices, data on coefficients representing image data being decomposed into a plurality of different subbands, each subband having a plurality of coefficients, wherein a first subband of the plurality of different subbands has a first set of coefficients, wherein a different second subband of the plurality of different subbands has a different second set of coefficients, wherein a precinct has the first and the second sets of coefficients from the first and the second subbands of the plurality of different subbands, wherein the first and the second sets of coefficients of the precinct belong to a spatial region of an image represented by the encoded image signal, and signaling information for signaling two different decoding modes for at least two different subbands of the precinct, wherein the first decoding mode and the second decoding mode are selected from a group of decoding modes having at least two of a vertical inverse prediction decoding mode, a horizontal inverse prediction decoding mode, and a raw decoding mode.

Still another embodiment may have a non-transitory digital storage medium having stored thereon a computer program for performing a method for encoding image data, the image data being decomposed into a plurality of different subbands, each subband having a plurality of coefficients, wherein a first subband of the plurality of different subbands has a first set of coefficients, wherein a different second subband of the plurality of different subbands has a different second set of coefficients, wherein a precinct has the first and the second sets of coefficients from the first and the second subbands of the plurality of different subbands, wherein the first and the second sets of coefficients of the precinct belong to a spatial region of an image represented by the image data, the method having the steps of: determining, for each group of coefficients within a set, a greatest coded line index (GCLI); encoding the greatest coded line indices associated with the first set of coefficients of the precinct in accordance with a first encoding mode, and encoding the greatest coded line indices associated with the second set of coefficients of the precinct in accordance with a second encoding mode, the second encoding mode being different from the first encoding mode; and outputting or storing an encoded image signal having data on the encoded greatest coded line indices and data on the coefficients, wherein the first encoding mode and the second encoding mode are selected from a set of encoding modes having at least two of: a vertical prediction encoding mode, a horizontal prediction encoding mode, and a raw encoding mode, when said computer program is run by a computer.

Another embodiment may have a non-transitory digital storage medium having stored thereon a computer program for performing a method for decoding an encoded image signal having data on encoded greatest coded line indices and data on coefficients having the steps of: determining different decoding modes for the data on the encoded greatest coded line indices for different subbands within a precinct, wherein the data on the coefficients represent image data being decomposed into a plurality of different subbands, each subband having a plurality of coefficients, wherein the precinct has different sets of coefficients from different subbands, wherein two sets of coefficients of a precinct belong to a spatial region of an image represented by the image data; and decoding the data on the encoded greatest coded line indices for the first set in the precinct using the first decoding mode and decoding the data on the encoded greatest coded line indices for the second set in the precinct using a second decoding mode as determined by the determining the different decoding modes, and decoding the data on the coefficients using decoded greatest coded line index data, wherein the first decoding mode and the second decoding mode are selected from a group of decoding modes having at least two of a vertical inverse prediction decoding mode, a horizontal inverse prediction decoding mode, and a raw decoding mode, when said computer program is run by a computer.

The present invention is based on the finding that the coding efficiency on the one hand or the encoding quality on the other hand can be enhanced by determining, for each subband within a precinct, i.e., for each plurality of coefficients from a subband within a precinct, an own encoding mode for encoding the greatest coded line index (GCLI) data.

Thus, a concept for encoding image data, where the image data is decomposed into a plurality of different subbands, where each subband comprises a plurality of coefficients, and wherein a precinct comprises different sets of coefficients from different subbands, where two sets of coefficients of a precinct belong to a certain spatial region of an image represented by the image data relies on a determination of a greatest coded line index for each group of coefficients within a set of coefficients and, additionally, relies on an encoder for encoding the greatest coded line indices associated with a certain set of a precinct in accordance with a first encoding mode and for encoding the greatest coded line indices associated with a second set of the same precinct in accordance with a second encoding mode, where the second encoding mode is different from the first encoding mode. Furthermore, the output interface of an apparatus for encoding image data outputs an encoded image signal having data on the encoded greatest coded line indices for the individual subbands/sets of coefficients and, additionally, data on the corresponding coefficients.

On the decoder-side, the present invention relies on the functionality that there is a decoding mode determiner for determining different decoding modes for the data on the encoded greatest coded line indices for different subbands within a precinct, wherein the data on the coefficients represent image data being decomposed into a plurality of different subbands, each subband comprising a plurality of coefficients, where the precinct comprises different sets of coefficients from different subbands. Particularly, the decoder for decoding the data on the encoded greatest coded line indices for the first set in the first precinct uses a first decoding mode and for decoding the data on the encoded greatest coded line indices for the second set in the precinct, a second decoding mode is used as determined by the decoding mode determiner. Furthermore, the data on the coefficients is then decoded using the decoded greatest coded line index data obtained by using the different decoding modes per subband or set of coefficients.

Due to the fact that individual encoding or decoding modes are made possible for individual sets of coefficients or subbands within a precinct, the computational efficiency is enhanced, since the number of bits to encode the greatest coded line indices (GCLI) values is reduced. This is due to the fact that there is a high potential for correlated or closely related GCLI values within a subband making them useful for some kind of prediction, but the GCLI values can vary substantially within a precinct from subband to subband.

Some embodiments rely on an actual mode determination based on the individual subband. Thus, in one embodiment, a specific encoding mode can be predetermined for each subband irrespective of the actual data. Such procedure is extremely efficient, since the encoding mode does not have to be transmitted from the encoder to the decoder, but can be predetermined on the encoder side and on the decoder side.

Other embodiments rely on an actual determination of the encoding mode based on the image data. A specific embodiment relies on the calculation of the data budgets for the individual subbands or precincts in order to determine the encoding mode for each subband. This procedure can be used fully integrated within a quantization determination based on a GTLI procedure (GTLI=greatest trimmed level index or greatest trimmed line index) corresponding to a certain truncation point). However, GTLI encoding can also be used as a lossless encoding, where any truncation is not performed and, therefore, any GTLI processing is not necessary. However, it is of advantage to use, in addition to GCLI processing also GLTI processing in order adapt the bitrate to a certain target bitrate or in order to obtain a constant bitrate as the case may be.

Further embodiments rely on the mixed procedure, where, for certain subbands within a precinct, the same or different encoding modes are predetermined and where, for other, typically, the lower subbands representing the high resolution information, the encoding modes are calculated based on the used bit budgets, i.e., are calculated based on the actual image data.

Further embodiments rely on a greatest coded line index determination for a group of coefficients, where the number of coefficients within a group is greater than two and, advantageously equal to four. Furthermore, the actual lossy encoding or quantization based on the determined truncation point, i.e., the GTLI processing is performed in such a way that the same GTLI is determined for a whole precinct. However, in other embodiments, the same GTLI is determined for an individual subband. Thus, it is of advantage to use a higher granularity for the truncation point determination compared to the greatest coded line index determination.

In further embodiments, three different encoding modes are performed, i.e., a horizontal prediction mode, a vertical prediction mode or a raw mode without any prediction.

However, other encoding modes can be performed as well such as a run length mode, or a prediction mode not in the horizontal or vertical direction but in a kind of a skewed direction where, for example, a prediction is not performed between GCLI values of coefficients abutting to each other vertically, but a prediction is performed between GCLIs associated with coefficients that are shifted to each other horizontally. Thus, the different encoding modes can be determined as needed and can, therefore, be determined to be five, six, or even more encoding modes. Furthermore, the encoding modes do not necessarily have to always include a horizontal or a vertical prediction mode, but the different encoding modes can also consist of, for example, the raw mode and the skew mode or any other combination of encoding modes.

In further embodiments, other procedures are performed within the encoder or the decoder. Particularly, the image data can be subjected to a color transform before being introduced into the discrete wavelet transform operation. Alternatively or additionally, a sign-magnitude transform can be performed before performing the GCLI extraction.

Furthermore, the result of the GCLI prediction can be entropy encoded such as by using an unary code while, for example, the raw data is introduced into the bitstream as it is, i.e., without further coding.

Furthermore, the result of truncation or GTLI trimming of the coefficient data can be introduced into the data stream as it is, i.e., packed into the data stream, but, alternatively, further encoding operations such as Huffman encoding or arithmetic coding or any other kind of entropy coding can be used in addition. For complexity reasons, however, it is of advantage to pack the output of the GTLI controlled trimming or truncation, i.e., to remaining bits between a GCLI indicated bit-plane and a GTLI indicated bit-plane directly into the encoded image signal, i.e., directly into a bitstream of binary data.

BRIEF DESCRIPTION OF THE DRAWINGS

Embodiments of the present invention are subsequently discussed with respect to the enclosed drawings, in which:

FIG. 1 illustrates a wavelet transform of an image with exemplary two vertical and five horizontal decompositions;

FIG. 2b illustrates prediction rules for horizontal or vertical prediction with respect to the encoder-side;

FIG. 2c illustrates prediction rules for an "inverse" prediction with respect to horizontal or vertical prediction related to the decoder-side;

FIG. 2d illustrates a raw mode;

FIG. 3 illustrates precinct organizations;

DETAILED DESCRIPTION OF THE INVENTION

Figure 6:
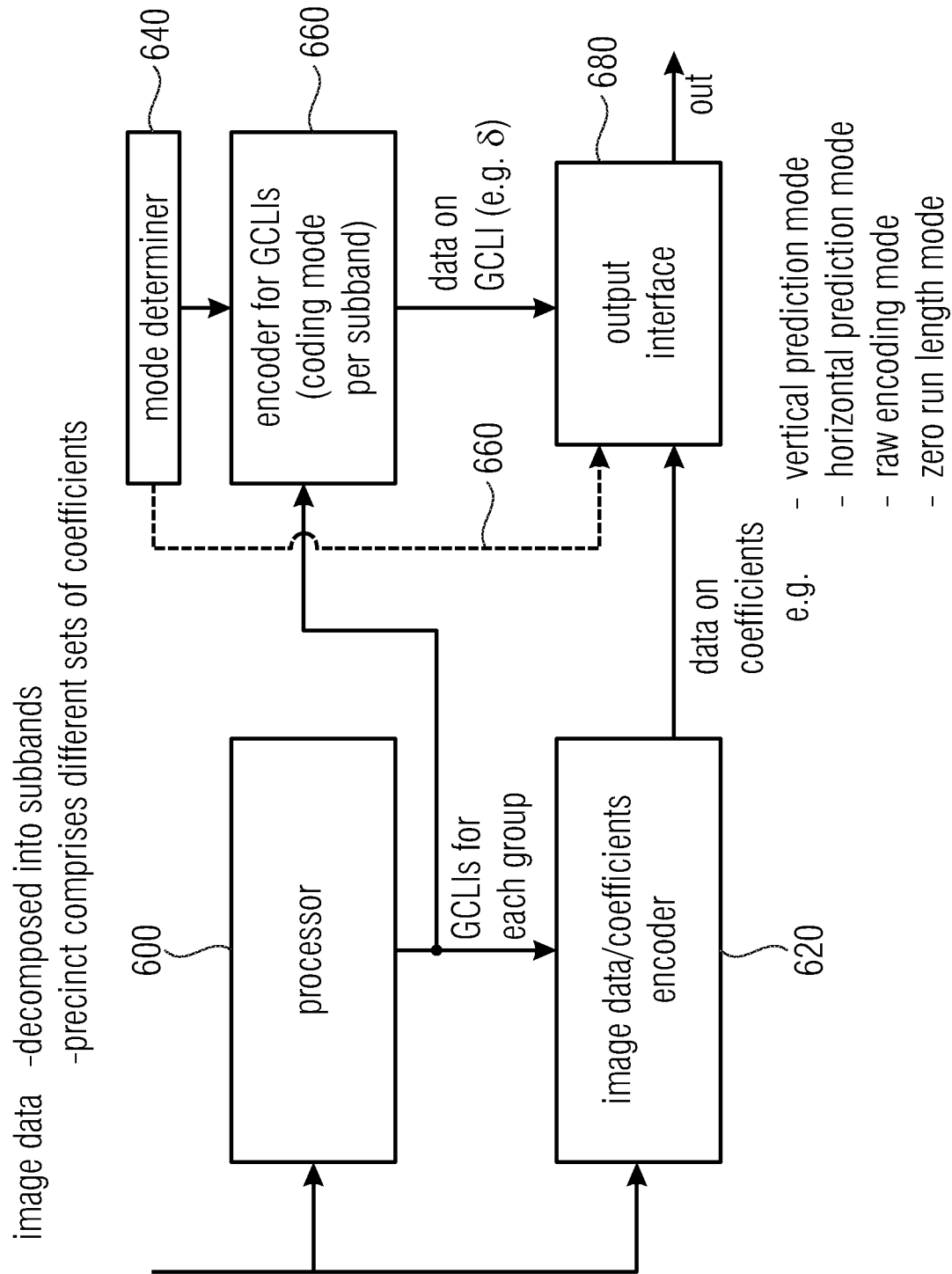
FIG. 6 illustrates a block diagram of an apparatus for encoding image data of an embodiment.

FIG. 6 illustrates an apparatus for encoding image data, where the image data is decomposed into a plurality of different subbands, where each subband comprises a plurality of coefficients. Particularly, a precinct comprises different sets of coefficients from different subbands, and two sets of coefficients of a first precinct belong to a first spatial region of an image represented by the image data and, for example two sets of coefficients of a second precinct belong to a second spatial region of an image represented by the image data, where the first spatial region and the second spatial region are different from each other and are, advantageously, even exclusive to each other, so that the first spatial region and the second spatial region do not have any subband positions in common. In this context, the spatial region of a coefficient can either by defined directly in the domain of transform coefficients, or in the domain of the image domain, when relating the transform coefficient with its central filter coefficient.

The apparatus for encoding image data comprises a processor 600 for determining, for each group of coefficients within a set of coefficients, a greatest coded line index (GCLI). Furthermore, the apparatus comprises an encoder 660 for encoding the greatest coded line indices associated with a first set of the first precinct in accordance with a first encoding mode and for encoding the greatest coded line indices associated with a second set of the first precinct in accordance with a second encoding mode, the second encoding mode being possibly different from the first encoding mode. Furthermore, the apparatus comprises an output interface 680 for outputting an encoded image signal (out) having data on the encoded greatest coded line indices and data on the coefficient values. Particularly, the coefficients are encoded using an image data/coefficients encoder 620 also illustrated in FIG. 6. The image data/coefficients encoder 620 receives, as an input, advantageously the same image data as are input into the processor 600. Additionally, block 620 also receives the GCLI data for each group, and block 620 outputs data on coefficients that are included into the output data signal by the output interface 680 as well.

Advantageously used encoding modes are a vertical prediction mode, a horizontal prediction mode, a raw encoding mode or a zero run-length mode or, as stated before, a skew prediction mode or any other coding or processing mode.

Figure 7:
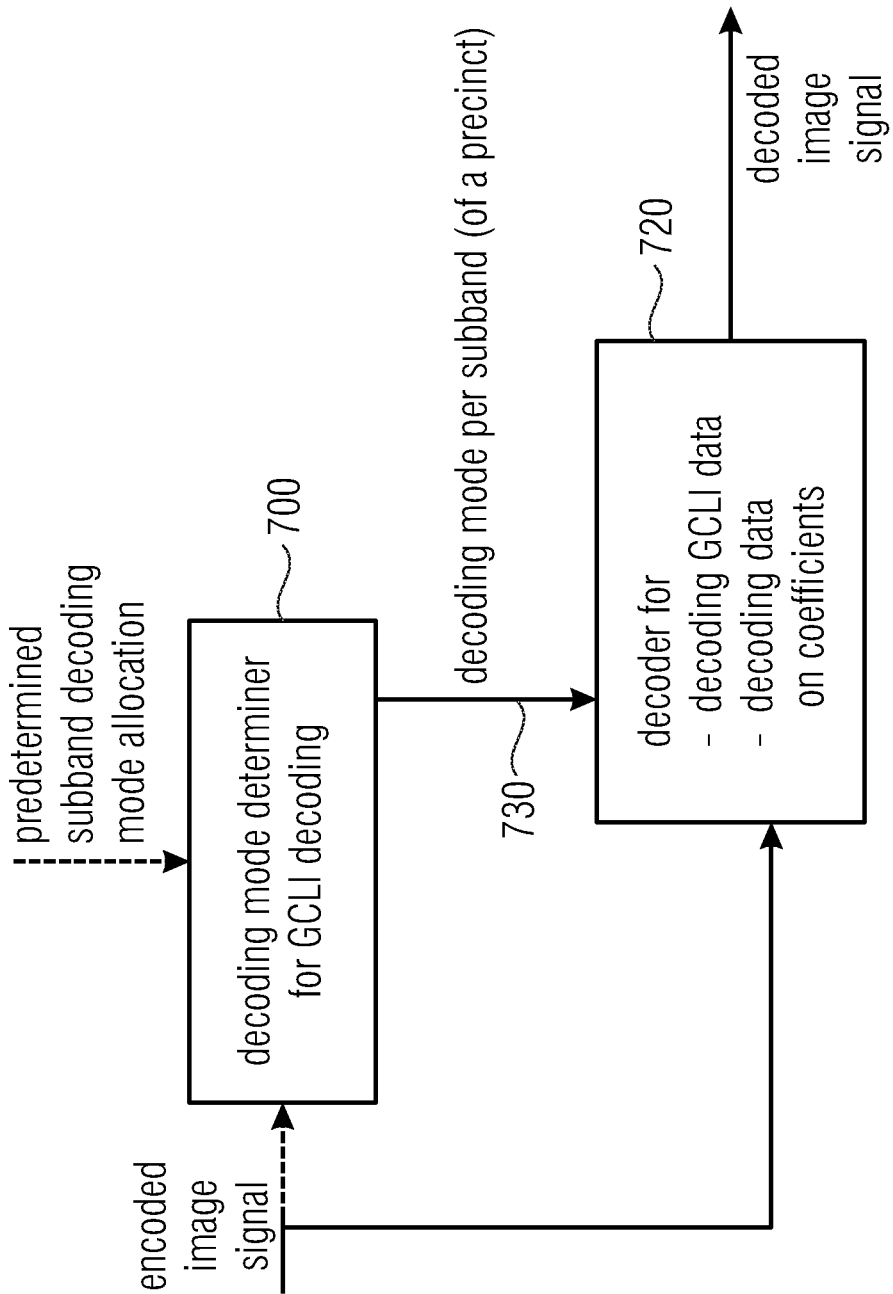
FIG. 7 illustrates an apparatus for decoding an encoded image signal of an embodiment.

FIG. 7 illustrates a corresponding apparatus for decoding an encoded image signal. The encoded image signal is input into a decoder 720. Additionally, the apparatus for decoding comprises a decoding mode determiner for determining different decoding modes for the data on the encoded greatest coded line indices for different subbands within a precinct. This decoding mode per subband of a precinct is forwarded via connection 730 from the decoding mode determiner 700 to the decoder 720. Depending on the implementation, the decoding mode determiner 700 is fed by the encoded image signal in order to extract the decoding mode, when such a decoding mode indication is included in the encoded image signal. However, in other embodiments, where the decoding mode per subband is fixed or predetermined, the decoding mode determiner only uses this predetermined decoding mode allocation per subband and does not need the encoded image signal. Therefore, the connection between the encoded image signal and the decoding mode determiner 700 is illustrated as a broken line in order to show the optionality. Consequently, the arrow with "predetermined subband decoding mode allocation" leading into block 700 is also illustrated in broken lines.

Figure 5:
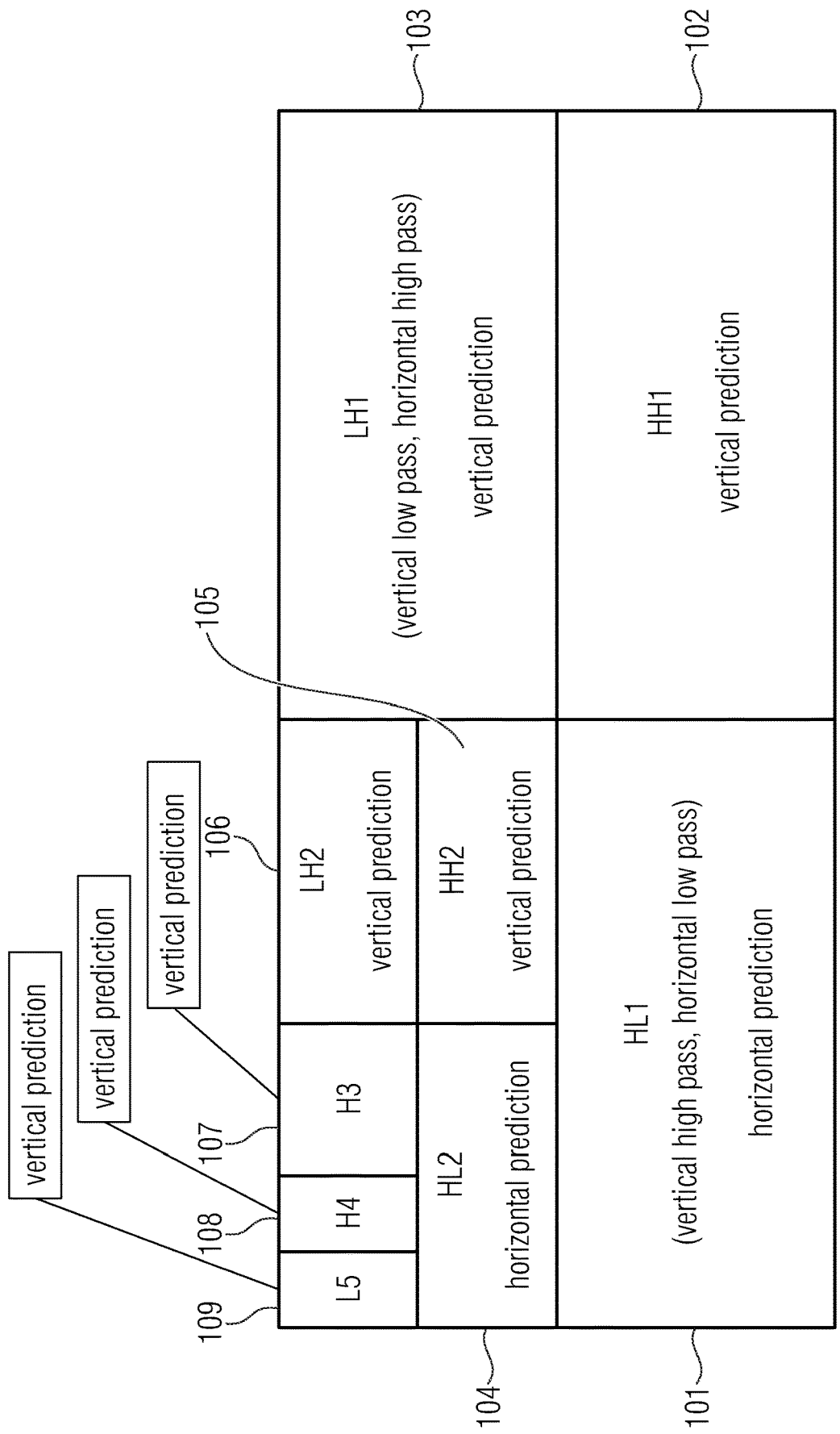
FIG. 5 illustrates a fixed prediction scheme for reduced encoder complexity.
Figure 8A:
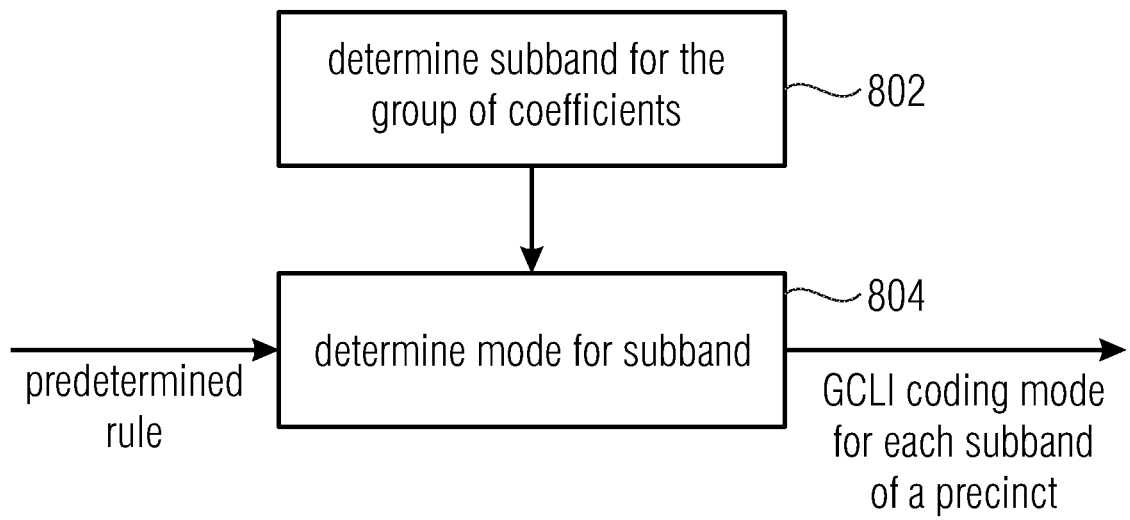
FIG. 8a illustrates an implementation of a mode determiner for determining the encoding modes for the subbands.

FIG. 8a illustrates an implementation of a coding mode determiner 640 also illustrated in FIG. 6 as being connected to the encoder 660 for the GCLI encoding. The mode determiner 640 is configured for determining the first encoding mode and the second encoding mode for the sets of coefficients based on the corresponding subband, to which a set of coefficients belongs to. This procedure is illustrated in FIG. 8a at blocks 802 and 804. An exemplary encoding mode per subband allocation is illustrated in FIG. 5 for each of the exemplary nine subbands 101, 102, 103, 104, 105, 106, 107, 108, 109. Particularly, subbands 101, 104 rely on the horizontal prediction mode for the encoding of GCLI data and the other subbands 102, 103, 105, 106, 107, 108, 109 rely on the vertical prediction mode per subband.

Figure 8B:
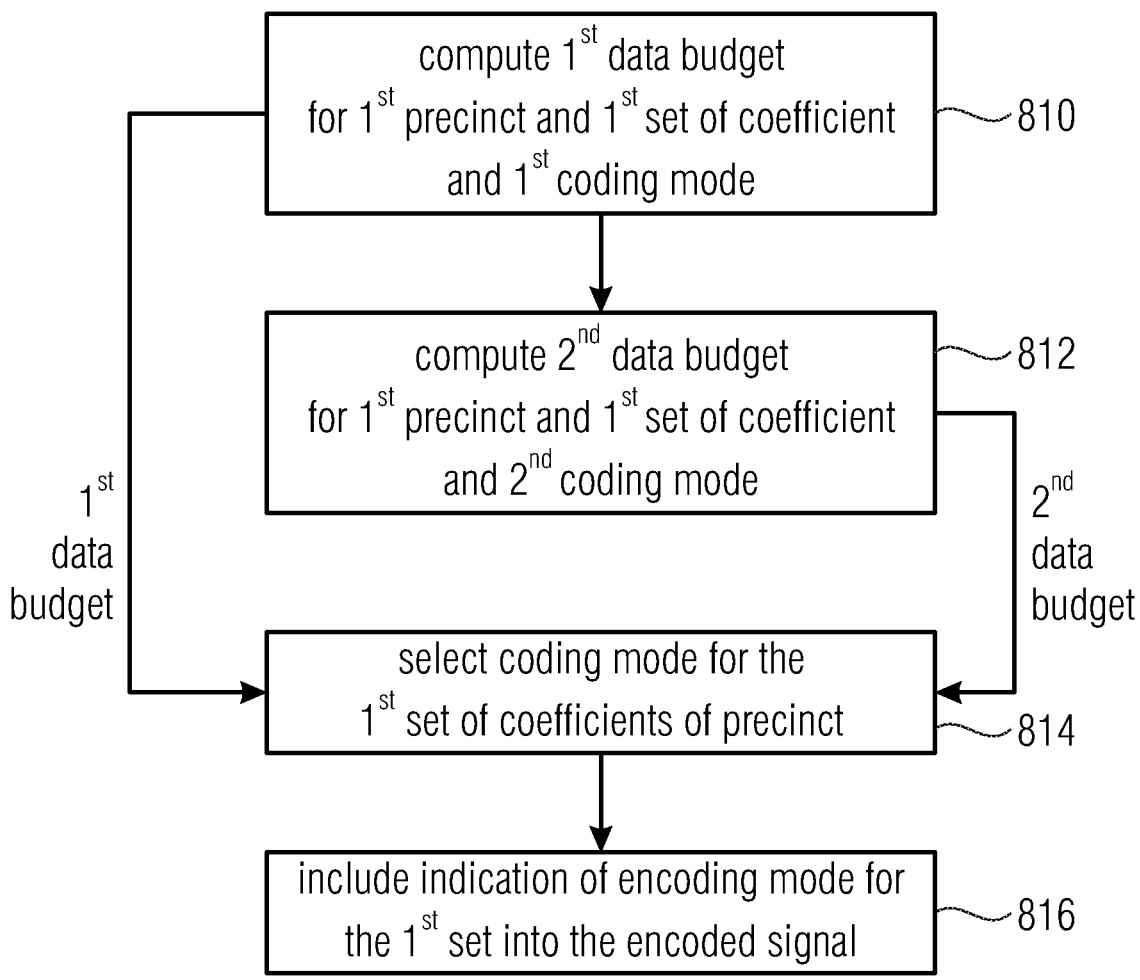
FIG. 8b illustrates a further implementation of the encoding mode determiner for the calculation of the encoding mode for a subband.

In an alternative embodiment, the determination of the encoding mode for a subband performed by the mode determiner 640 is performed as illustrated in FIG. 8b. Particularly, the mode determiner 640 is configured for determining the first encoding mode and the second encoding mode by computing 810 a first bit budget for a first precinct and the first set of coefficients within the first precinct and the first encoding mode. Furthermore, the mode determiner 640 computes 812 a second bit budget for the first precinct and the first set of coefficients, but now for a second encoding mode. Both the first bit budget and the second bit budget calculated by blocks 810, 812 are used by the mode determiner 640 to select 814 an encoding mode for the first set of coefficients of the first precinct. Then, in step 816 performed by the output interface 680 of FIG. 6, an indication of the encoding mode selected for the first set of coefficients is included into the encoded image signal. This is also indicated by broken line 660 of FIG. 6. In case of more than two encoding modes, the above steps are repeated accordingly.

Figure 4:
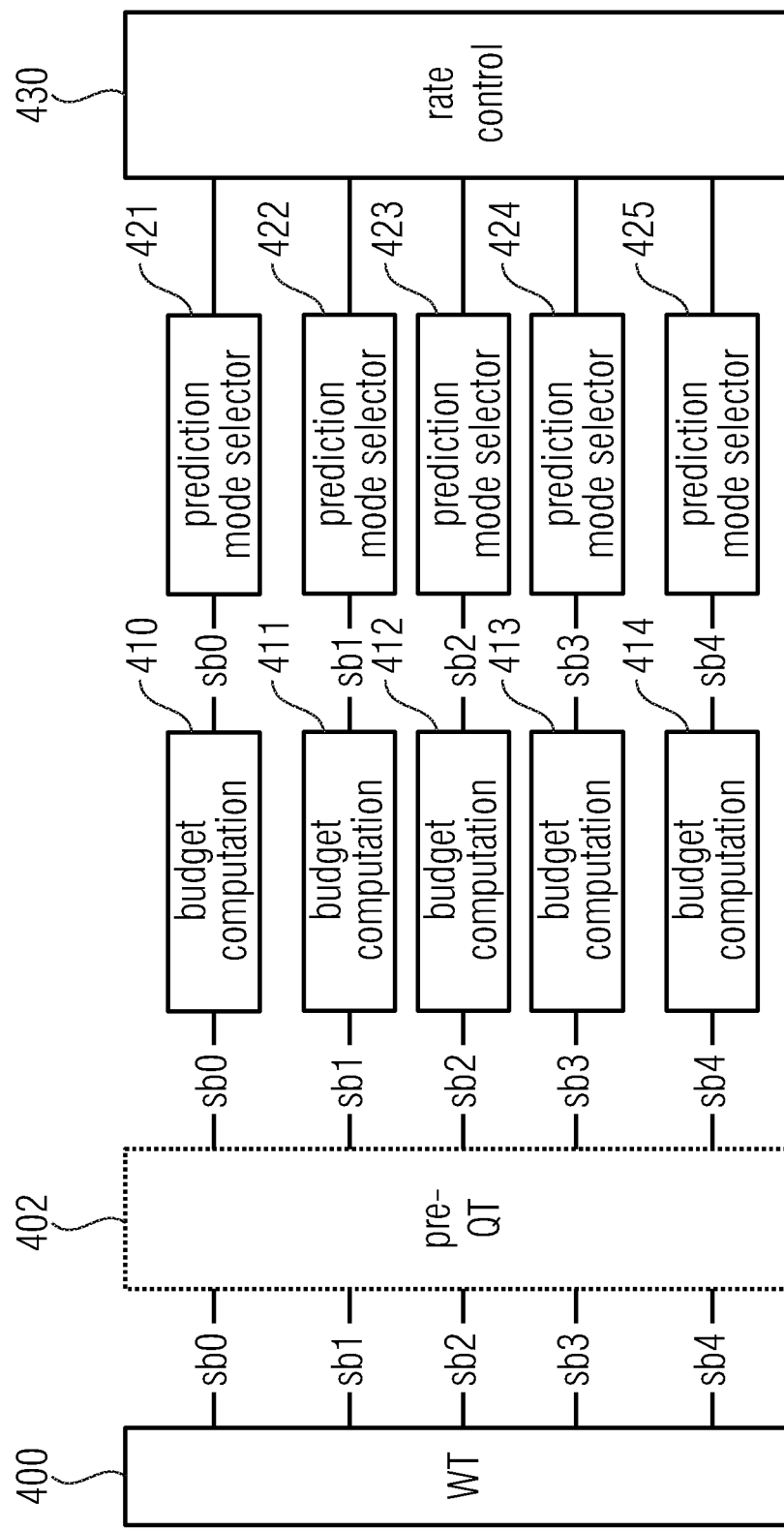
FIG. 4 illustrates a block diagram of a subband adaptive prediction scheme per subband.

FIG. 4 illustrates a further implementation of a block diagram of the subband adaptive prediction scheme per subband.

FIG. 4 illustrates the corresponding block diagram. The output of the frequency transform 400 is optionally prequantized 402 before being sent to a budget computation block 410-414. The budget computation block 410-414 computes for every subband and for every possible GTLI (truncation point) and every relevant prediction method the used budget for the given subband of the precinct to encode.

Supported by this information, the prediction mode selector 421-425 choses for every subband and every possible truncation point the best prediction method to use. Typically, this is done by selecting the prediction method with the smallest resulting bit budget for coding the GCLIs. Alternatively, a heuristic based on previous data can be used.

This information is then forwarded to the rate control 430, which combines the available rate information and selects a truncation point for every subband. Encoding is then performed using the prediction method determined by the prediction mode selector 421-425 for the chosen truncation point.

In order to allow the decoder to properly decode the image, corresponding signaling information (660 of FIG. 1) is included in the bitstream, informing the decoder about the chosen prediction scheme for every subband. Given that this signaling information is only used on the granularity of the precinct subband, and a small number of bits is used for this signaling, the impact on the coding efficiency can be neglected.

Figure 8C:
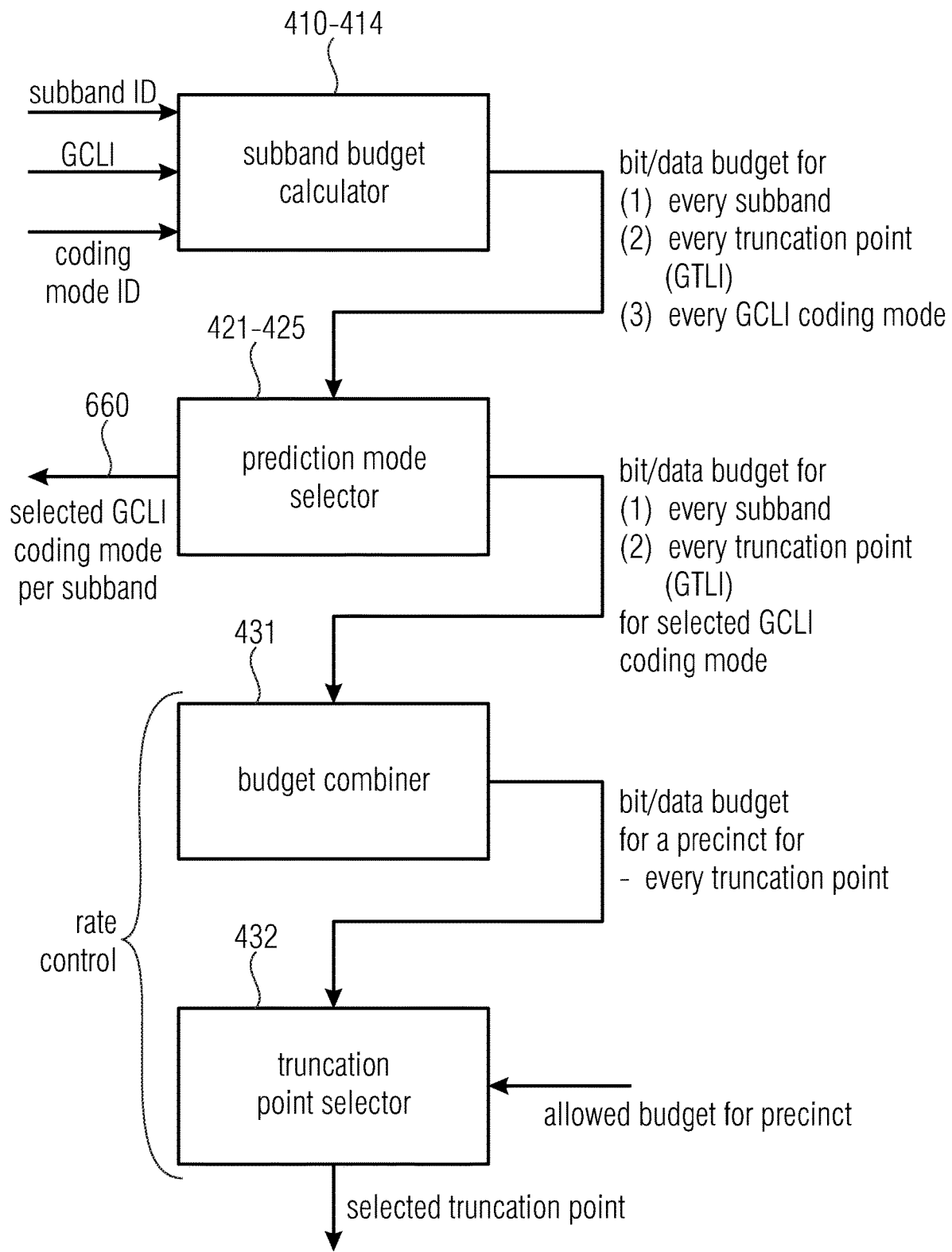
FIG. 8c illustrates a further embodiment of an encoding mode determiner.

FIG. 8c illustrates a further implementation of the mode determiner 640. The mode determiner comprises a subband budget calculator corresponding to blocks 410 to 414 of FIG. 4, a prediction mode selector for responding to blocks 421-425 of FIG. 4, a budget combiner 431 and a truncation point selector 432, where both the budget combiner 431 and the truncation point selector 432 together form the rate control illustrated at 430 in FIG. 4.

Particularly, the subband budget calculator 410 to 414 calculates a bit or, generally, a data budget for (1) every subband, (2) every truncation point (GTLI), and (3) every GCLI encoding mode. Thus, when there are, for example, two subbands, five different truncation points and three different GCLI encoding modes, then block 410-414, i.e., the subband budget calculator calculates 30 different data budgets. This is illustrated by the input into blocks 410-414 consisting of subband IDs, GCLI identifications and encoding mode identifications.

Based on the result of the subband budget calculator, the prediction mode selector generates bit or, generally, data budgets for (1) every subband and for (2) every truncation point (GTLI), and, particularly, now for the selected GCLI encoding mode. Please note that the selected GCLI encoding mode might depend on the considered truncation point. The selected GCLI encoding mode per subband and per truncation point is output by the prediction mode selector via the line 660 that is also illustrated in FIG. 6. Thus, from the original 30 values generated by the subband budget calculator for the above example, there now remain ten bit/data budget values that are obtained using the best prediction mode or, generally, using the selected GCLI encoding mode.

These exemplary ten values are now received by the budget combiner 431 that calculates a complete bit/data budget for a precinct for every truncation point by combining the individual subband-wise budget values for every truncation point. Thus, for the example here, the budget combiner 431 finally outputs five different budget values for the five different possible truncation points. Then, among these five different budget values, the truncation point selector 432 selects a truncation point associated with a budget value that is in line with an allowed budget for the precinct.

Next, the truncation points selected for each subband can be refined by reducing the truncation for visually important subbands without exceeding the available bit budget. Thus, a truncation point for every subband of a precinct is obtained that is now used by the quantizer 624 of FIG. 8*d* to quantize or truncate the bit-plane data for each coefficient exemplarily illustrated in FIG. 2*a*, where this data is stored in the raw data buffer as non-truncated data. Now, based on the selected truncation point for each subband/precinct and, exemplarily, for each color, truncated or quantized raw data or bit-plane data for each color are obtained. Depending on this situation, a truncation point can be calculated for each color individually or a single truncation point can be calculated for all colors or even two truncation points for a precinct can be calculated referring to, for example, two subbands within the precinct. Thus, when a precinct has, for example, ten subbands, then there would be five different truncation points for such a precinct.

Figure 8D:
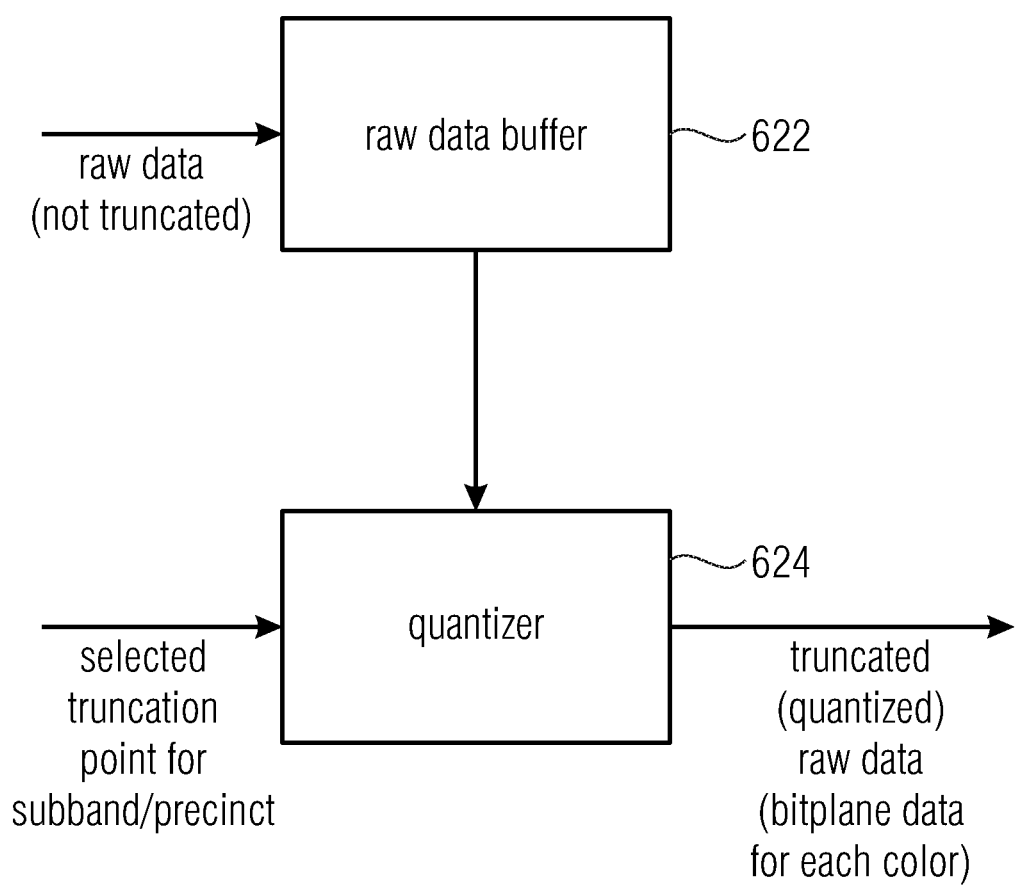
FIG. 8d illustrates a process of quantization based on a raw data buffer and a selected truncation point for a subband as, for example, determined by the process of FIG. 8c.
Figure 9:
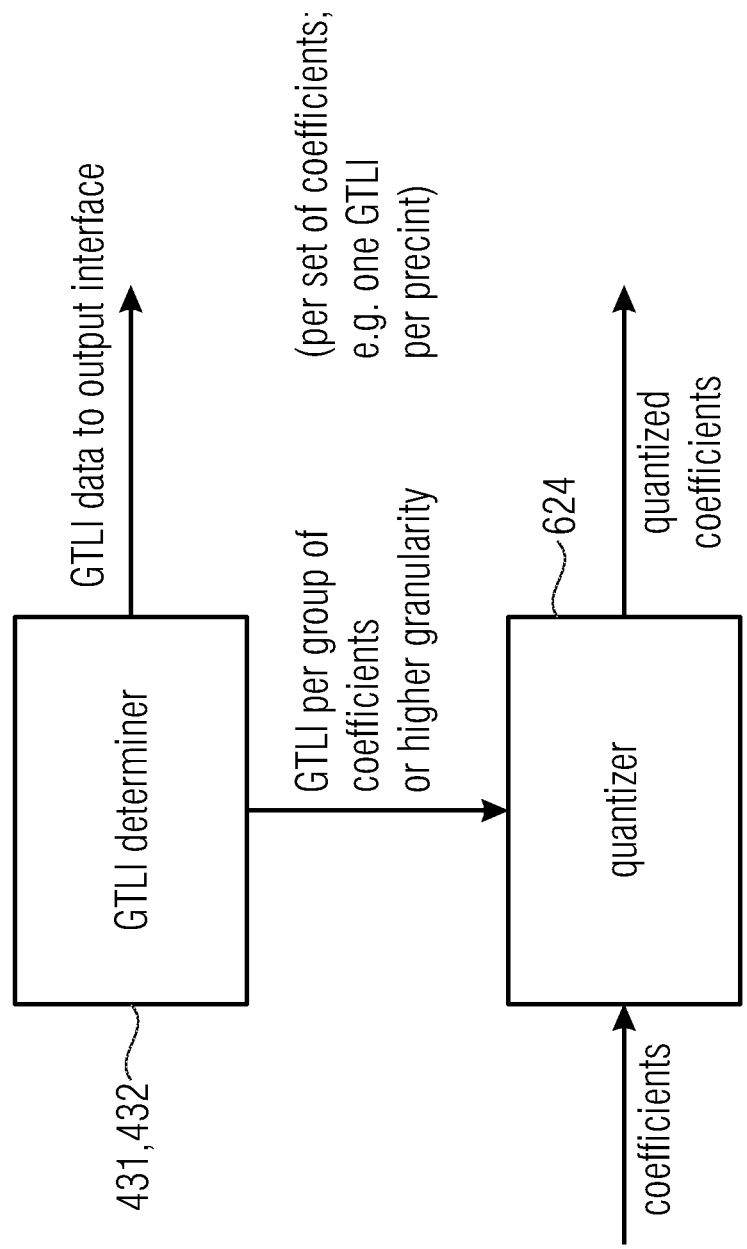
FIG. 9 illustrates a further embodiment of an aspect illustrating the cooperation of the determination of the GTLI values and the process of the quantization.

FIG. 9 illustrates a further implementation of the functionality illustrated with respect to FIG. 8*d*. The GTLI determiner illustrated in FIG. 8*c* by block 431 and 432 generates a GTLI per group of coefficients or a GTLI with an advantageously higher granularity such as for a set of coefficients (subband-wise), or a single GTLI per precinct. Then, based on this data, the coefficients are quantized by the quantizer 624 in order to output quantized coefficients.

Figure 10:
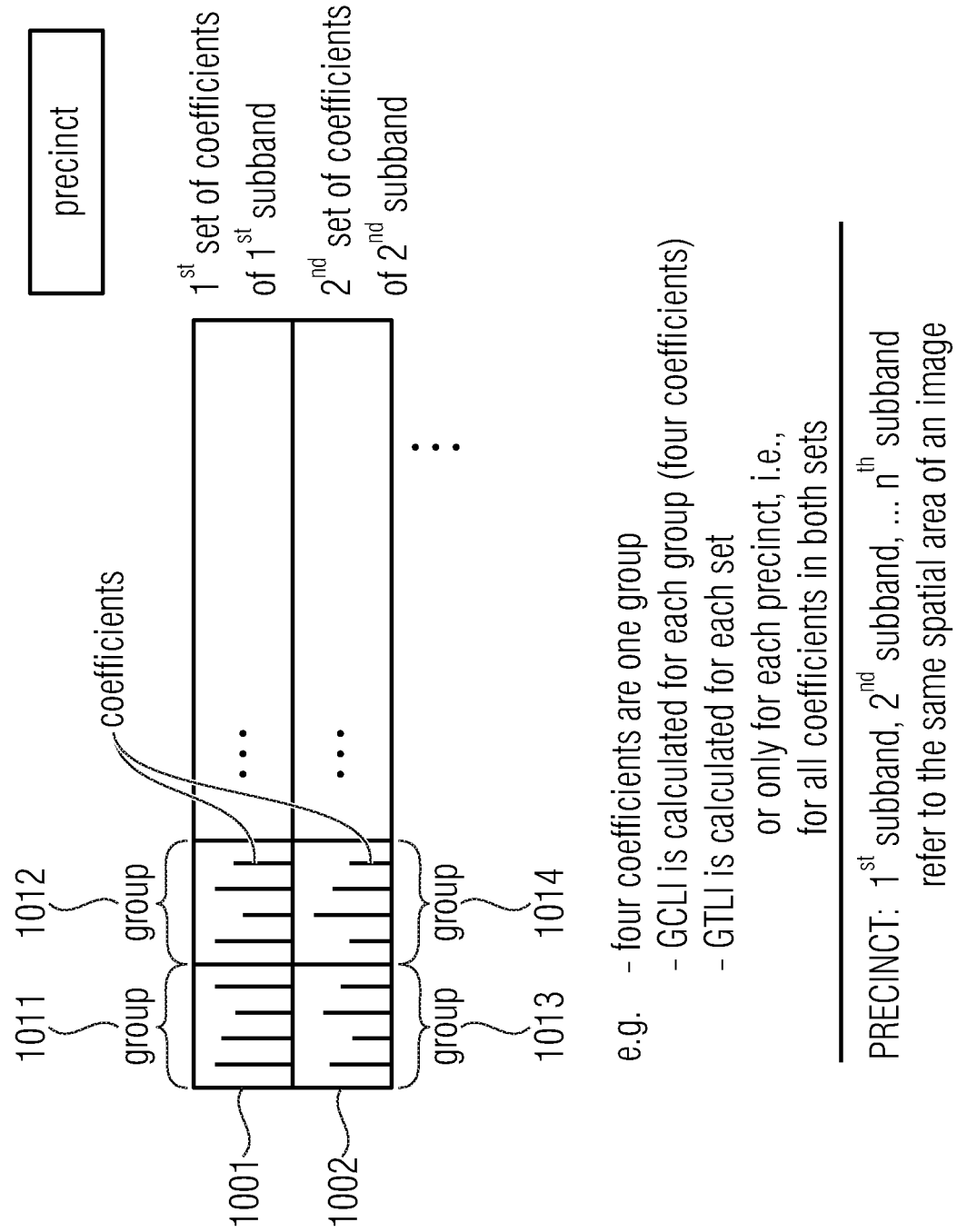
FIG. 10 illustrates a precinct having a first set of coefficients for a first subband, a second set of coefficients for a second subband and individual groups of coefficients.

FIG. 10 illustrates an exemplary implementation of a precinct consisting of only two subbands, where a first set of coefficients of a first subband is illustrated at 1001, and a second set of coefficients of a second subband is illustrated at 1002, where the first set of coefficients has, for example, the groups 1011 and 1012, and the second set of coefficients has the groups 1013 and 1014.

Advantageously, four coefficients are used in one group, and a GCLI value is calculated for each group of four coefficients, and a GTLI is calculated for each set of coefficients, i.e., for a whole subband or a single GTLI value is calculated for each precinct, i.e., for all coefficients in both sets 1001 and 1002. As already outlined before, a precinct generally comprises coefficient data of a first subband, coefficient data of a second subband, coefficient data for $n^{th}$ subband, where all the subbands refer to the same spatial area of an image.

Figure 11:
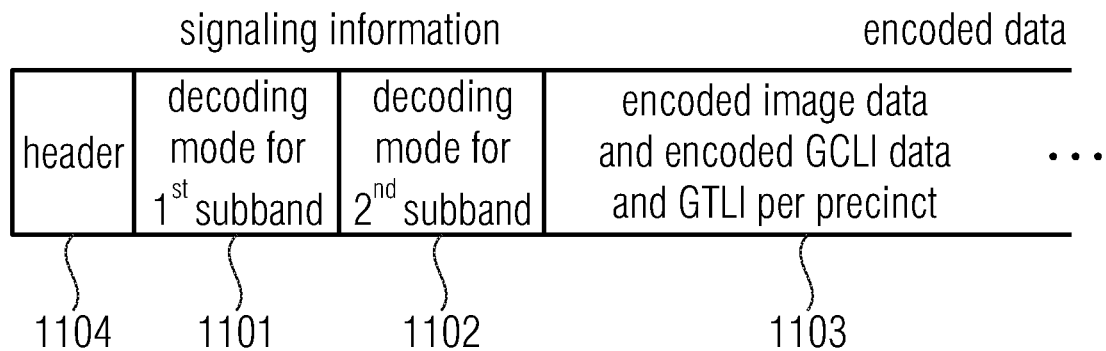
FIG. 11 illustrates an encoded image signal output by the apparatus for encoding of FIG. 6, for example or input into an apparatus for decoding of FIG. 7, for example.

FIG. 11 illustrates an exemplary representation of an encoded image signal. An encoded image signal comprises a decoding mode indication 1101 and 1102 for a first subband and a second subband generally indicated as "signaling information". Furthermore, the image data illustrated in FIG. 11 comprises encoded data comprising of encoded image data and encoded GCLI data illustrated at 1103. Furthermore, the encoded image signal may comprise a header comprising header data indicated at 1104 in FIG. 11. Although the encoded image signal is illustrated as a serial stream in FIG. 11, the encoded image signal can be in any data format.

2.1 Signaling Method

Many different possibilities exist to signal the prediction method that has been used for every subband. For instance, raw bits can be used to signal the method per subband as the bandwidth is usually negligible compared to the volume of the actual coded GCLIs. Variable bits can be therefore used when the targeted compression ratio is more important and when the budget of the signaling starts to be more significant.

2.2 Reduction of Computation Effort

On the one hand, the method presented in the previous section improves the compression efficiency. On the other hand, it slightly increases the used hardware register storage space, since a separate register per subband needs to be provided for the budget computation. If all subbands were using the same prediction method, these registers could be possibly combined to a single register.

In order to compensate this problem, it is important to notice that the coding gain resulting by the previously described method is majorly originated in a small number of subbands. In other words, it is possible to decide in advance that a subset of the precinct subbands shown in FIG. 3 use the same prediction method without scarifying significant coding efficiency, and only a small subset of the subbands can choose their prediction method independently of the other ones.

By these means, the increase in hardware effort can be limited while still leveraging the increased coding efficiency of the proposed method. At the same time, the signaling overhead for selecting the correct prediction method at the decoder can be reduced.

3 Fixed Prediction Scheme for Reduced Encoder Complexity

The method described in Section 1.4.2 deviated from the state of the art [2] in that not all subbands of the precinct need to use the same prediction method. By allowing a dynamic adaption of the prediction scheme to the image content, a better coding efficiency can be achieved.

Alternatively, the prediction scheme can be fixed for every subband, while still allowing different prediction schemes between the subbands of a precinct. By these means, the search space can be reduced.

FIG. 5 shows a corresponding example. It assumes that coefficients belonging to a certain subband are predicted by the same prediction scheme. Coefficients belonging to different subbands can use different prediction schemes.

Using such a method provides the advantage of a reduced search space in the encoder, since for every subband, it is clear which prediction method to use, and it is hence not necessary to compute budgets for different prediction methods and then use the one with the smallest budget.

While using such a scheme does not deliver the coding performance of the method described in Section 1.4.2 or of the fully adaptive or partly adaptive encoding mode selection, it gets close to the state of the art method selecting between horizontal and vertical prediction on a precinct granularity, without the need to compute budgets for two prediction methods. In other words, it provides similar coding efficiency with reduced complexity.

Figure 12:
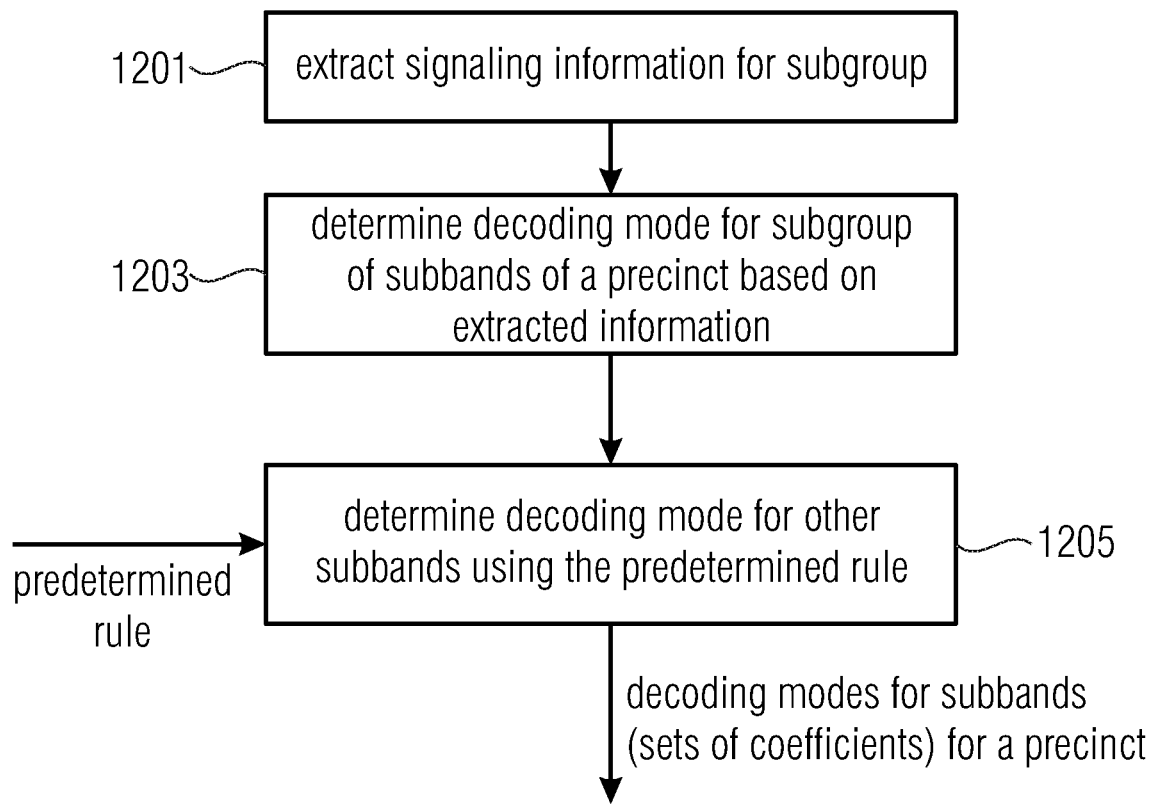
FIG. 12 illustrates a procedure performed by the decoder included within an apparatus for decoding an encoded image signal of FIG. 11.

FIG. 12 illustrates a procedure that is in between the fixed prediction scheme of FIG. 5 or the completely adaptive prediction scheme of FIG. 4. The procedure in FIG. 12 is partly fixed and partly adaptive. In this situation, the encoded image signal only comprises signaling information for a subgroup of subbands such as only for the two lowest subbands 101 and 102, where the decoding modes for the other subbands are determined using the predetermined rule, i.e., for the subbands 103-109 in line with, for example, the allocation illustrated in FIG. 5. Thus, the decoding mode determiner of FIG. 7 illustrated at block 700 is configured to extract 1201 signaling information for a subgroup from the encoded image signal and, then, determines 1203 the decoding mode for the subgroup of subbands of a precinct based on the extracted information. Furthermore, the decoding mode determiner 700 is configured to determine 1205 the decoding mode for other subbands not included in the subgroup processed by block 1201 using the predetermined rule. Thus, subsequent to the procedure of block 1205, decoding mode determiner has the decoding modes for all subbands (sets of coefficients for a precinct).

In this "mixed" implementation in FIG. 12, the encoder procedure is so that the operation illustrated with respect to FIGS. 8b and 8c is only performed for the subgroup of subbands, and the procedure illustrated in 8a is performed for the other subbands. Therefore, the encoder complexity is reduced with respect to the fully adaptive procedure, but, nevertheless, the adaptively is maintained at least for some subbands.

Figure 13:
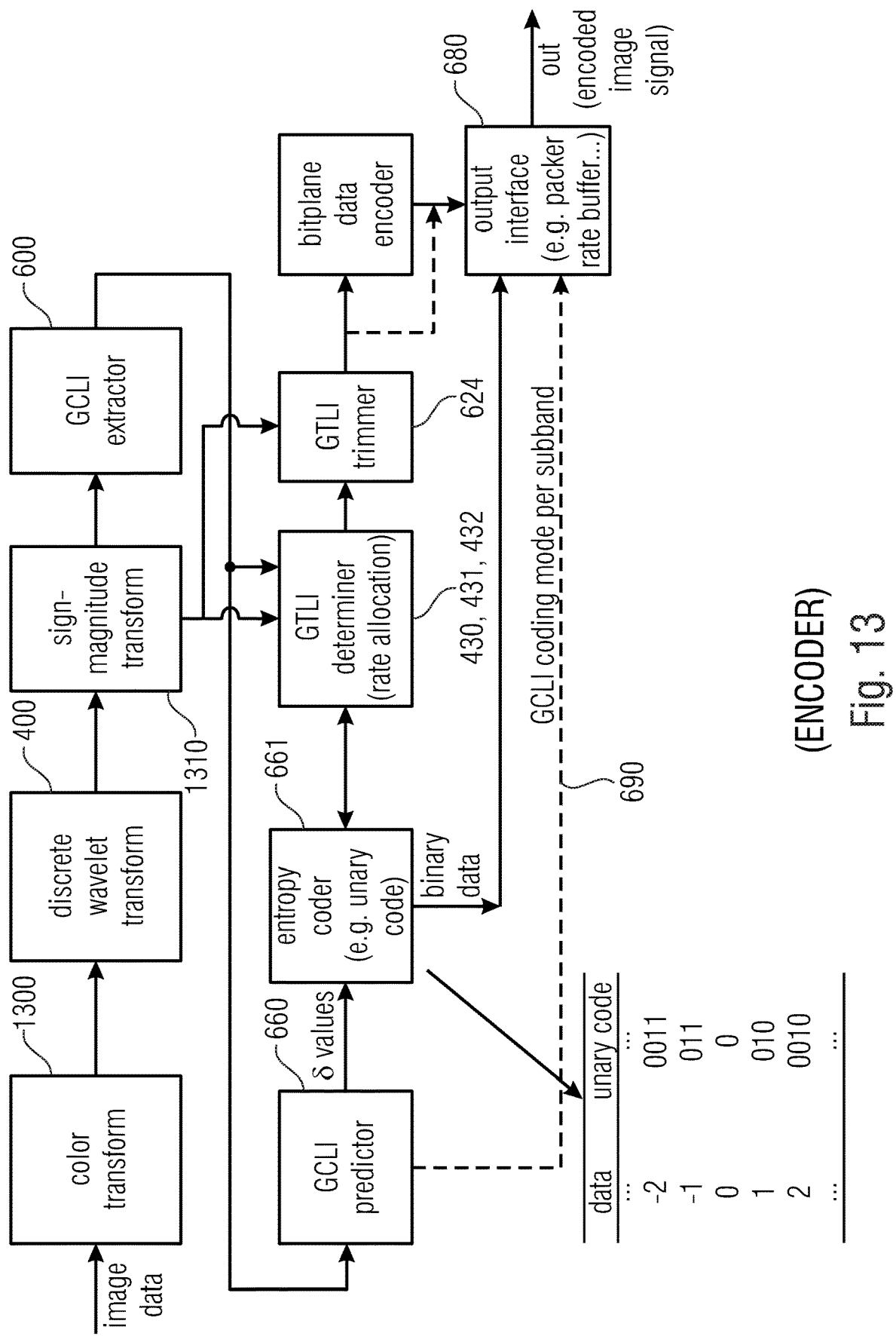
FIG. 13 illustrates a block diagram of an encoder in a further embodiment.
Figure 14:
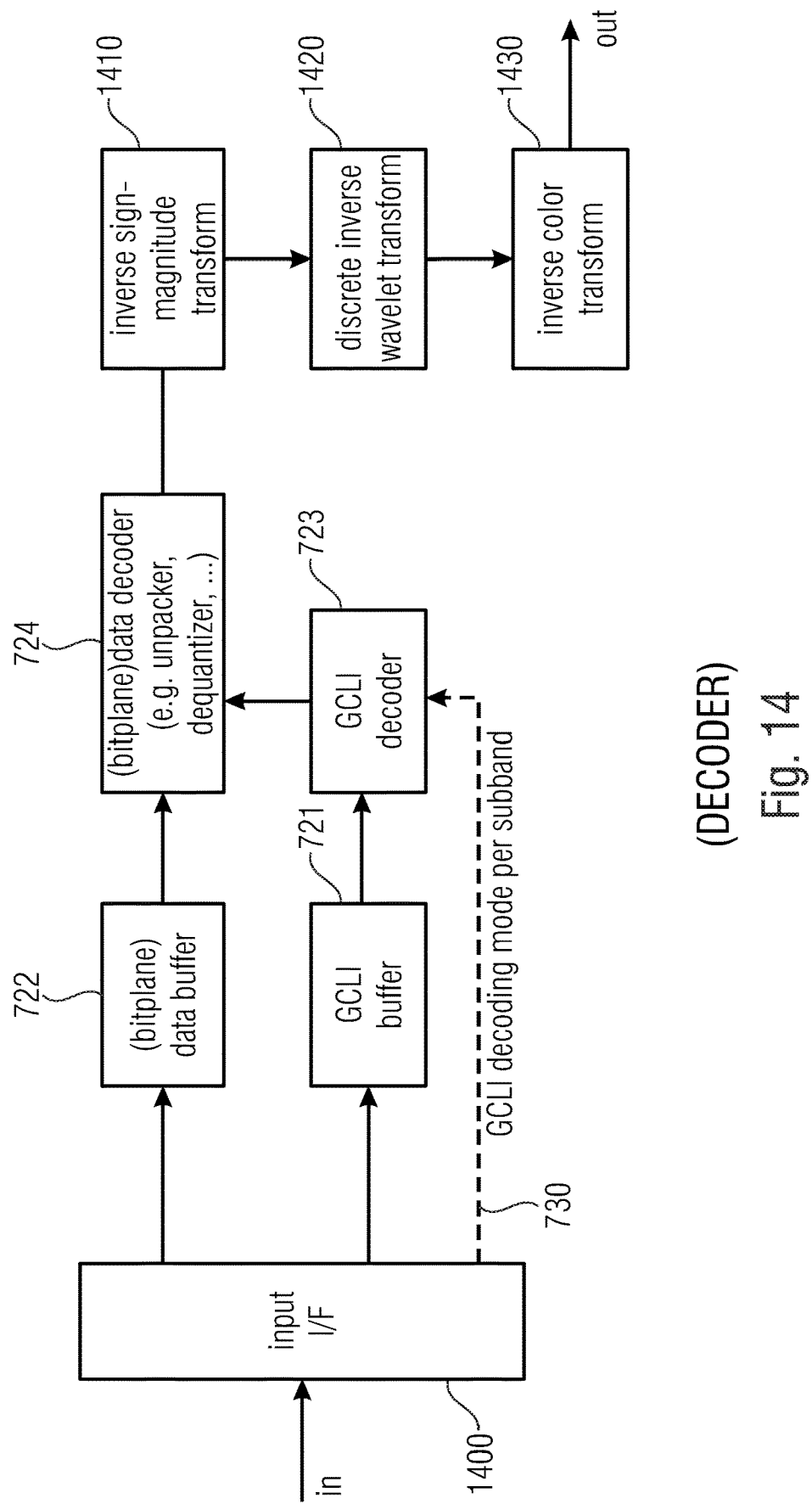
FIG. 14 illustrates a block diagram of a decoder in a further embodiment.

FIG. 13 illustrates an implementation of an image data encoder with a schematic cooperation of certain global blocks. FIG. 14 illustrates a corresponding illustration of the decoder that can cooperate with the encoder of FIG. 13 or with another encoder.

The color transform 1300 of FIG. 13 is a reversible integer-to-integer transform, used for lossless and lossy compressions, which de-correlates RGB color information. The forward reversible color transform RCT results in Y, U, V data or a similar color space. After this transformation, each color component can be processed independently from each other. In case of YCbCr image data, the color transform 1300 is bypassed because the color components are already de-correlated.

FIG. 14, block 1430 illustrates the inverse color transform in order to calculate Y, U, V data back into, for example, RGB color information as the output signal.

Block 400 in FIG. 13 illustrates a discrete wavelet transform, and, correspondingly, block 1420 of the decoder illustrates at discrete inverse wavelet transform. The discrete wavelet transform (DWT) offers a spatial-frequency representation that ensures a good decorrelation of a signal. Typically, the output coefficients of a wavelet transform are coded in a two's complementary representation. For the purpose of entropy coding, these values are transformed to implement a sign and magnitude representation. This is illustrated by block 1310 in FIG. 13 and the corresponding inverse operation is illustrated by block 1410 in FIG. 14. Positive data does not have to be modified as they are represented identically in both methods. Negative samples are to be inverted before being incremented by "one".

Figure 2A:
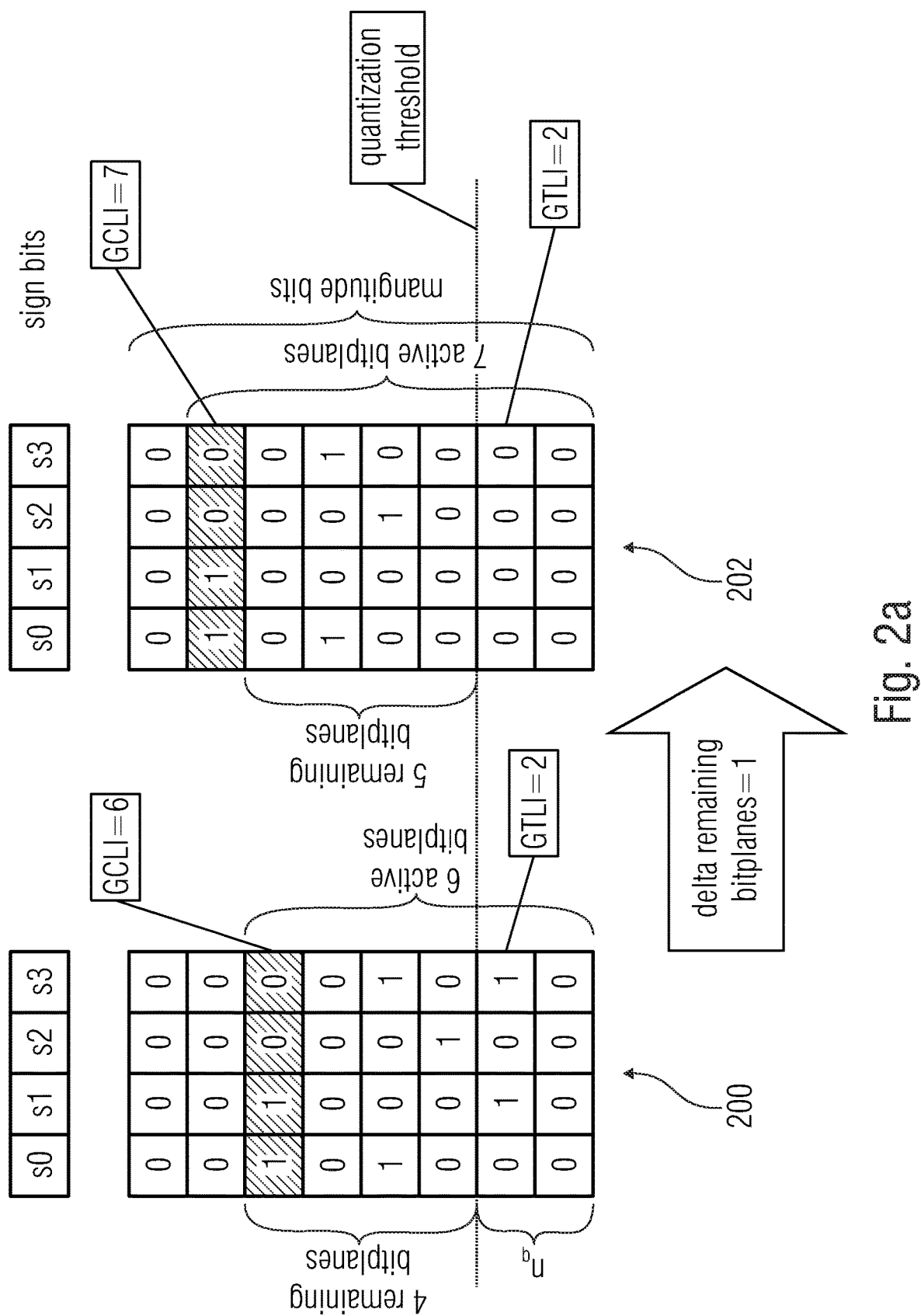
FIG. 2a illustrates a principle of GCLI encoding.

The entropy coding performed by the procedures illustrated by blocks 600, 660, 661, 430, 431, 432, 624 in generally bases on block fixed length coding, on top of which some optimizations have been brought to ensure a better coding efficiency. The implementation leaves the output wavelet data untouched until packing the bit stream, and this, for example, illustrated with respect to FIG. 8d illustrating the raw data buffer 622. Only a stream of indexes (GCLI) uses processing resources. Wavelet subband coefficients are grouped into subsets of four samples. Each subset is viewed in a bit-plane representation. For each subset, a greatest coded line index (GCLI) is found. It is the index of the most significant non-null bit-plane as illustrated in FIG. 2a. If there is at least one non-null bit-plane in the subset (GCLI greater than 0), the non-null bit-planes of the subset are copied as is in the output stream. Alternatively, they can be first processed for refining the quantization, before being copied in the output stream. A buffer stores all raw data before packing the output stream, allowing for the rate allocation to decide which part of the data are relevant for the output stream. GCLI indexes are further compressed and packed upstream of the raw data. A vertical prediction is performed between two subband lines of GCLIs. The result is the difference between the GCLI value and the GCLI value of the same subset of coefficients in the previously coded line.

Predicted predictive values are afterwards coded following a unary coding method illustrated in FIG. 13 close to the entropy coder block 661. The table shows a simple signed unary variable length code for GCLI encoding. Such an unary code associates a specific variable length code to each symbol, possibly dependent on some context information. Hence, while the unary code in FIG. 13 represents one possible solution, alternative unary code schemes are possible as well, for instance by replacing the 0s by 1s and vice versa. One such alternative is described in [7] and alternatively encodes positive and negative prediction residuals. GCLIs are also predicted horizontally. The symbol coded is then the difference between the GCLI value and the value of the GCLI that was previously coded belonging to the same line and the same wavelet subband.

Other prediction modes are possible as well in addition to or instead of the raw mode. Data and GCLI predicted values are truncated by the rate allocation mechanism. The grouping of coefficients results in a trade-off between efficiency of the compression scheme and the complexity of the system. The number of coefficients in each subset has been chosen before because it provides the best trade-off between compression efficiency and hardware complexity for high throughput.

Figure 15:
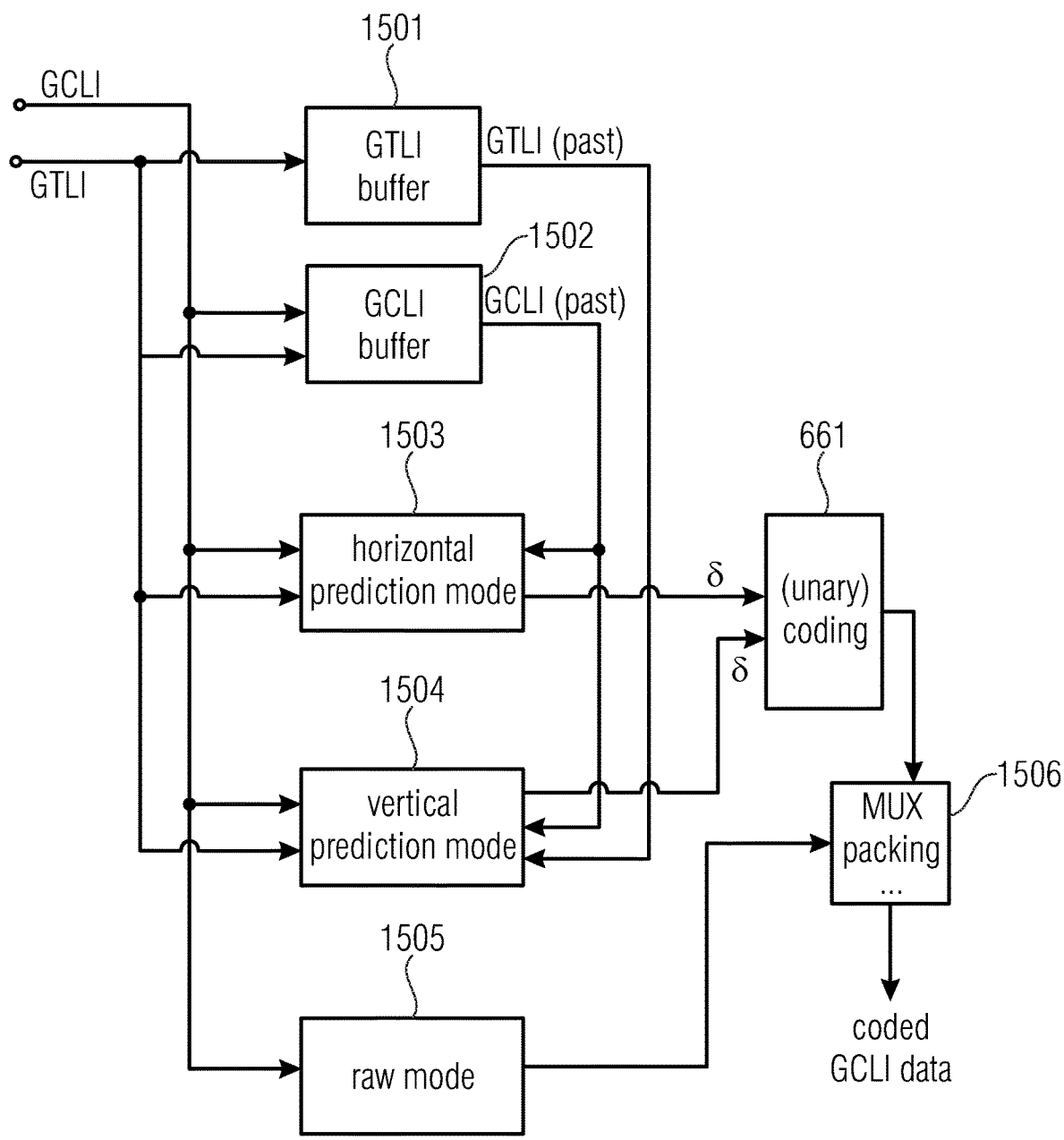
FIG. 15 illustrates a further implementation of an aspect of the encoder.

Once they are coded, the output of every coding unit is packed together. An exemplary procedure is illustrated in FIG. 15. Particularly, FIG. 15 illustrates a GTLI buffer 1501, a GCLI buffer 1502, a horizontal prediction mode calculator 1503, a vertical prediction mode calculator 1504 and a raw mode processor 1505. Furthermore, FIG. 15 illustrates an (unary) coder implementing, for example, the code illustrated in FIG. 13 close to the entropy coder 661 and FIG. 15 additionally illustrates a multiplexor/data packer 1506 for generating the coded GCLI data. Particularly, block 1503 calculates the horizontal prediction mode in order to generate a $\Delta$ value based on a "current" GCLI value and based on a "past" GCLI value from the buffer 1502. Correspondingly, block 1504 also calculates a $\Delta$ value based on the "current" GCLI value received as an input and based on a "past" GCLI value received from the GCLI buffer 1502. The terms "current" and "past" does not refer to time but to the position within a subband for a certain group of coefficients. Then, the corresponding $\Delta$ value is (unary) coded. Naturally, for a certain subband, either the result of block 1503 or the result of block 1504 or the result of block 1505 is input into the coded GCLI data. It is to be noted that the budget allocated to the GCLI is bonded by the raw coding meaning that there are at most four bits per GCLI in the implementation. Furthermore, the data that are generated by the unary code is coming in a continuous flow at the decoder-side, and it is, therefore, possible to pre-calculate state variables. Thus, this allows breaking feedback loops thanks to stop bits of the unary code.

During the rate allocation and the GCLI packing process, bit-plane data is stored in a buffer, before being packed in the output stream. Due to the fact that this buffer is an important resources cost of the codec system, it is of advantage to design the buffer as small as possible, and it has been found that a buffer as small as storing only up to ten lines may be sufficient.

Figure 16:
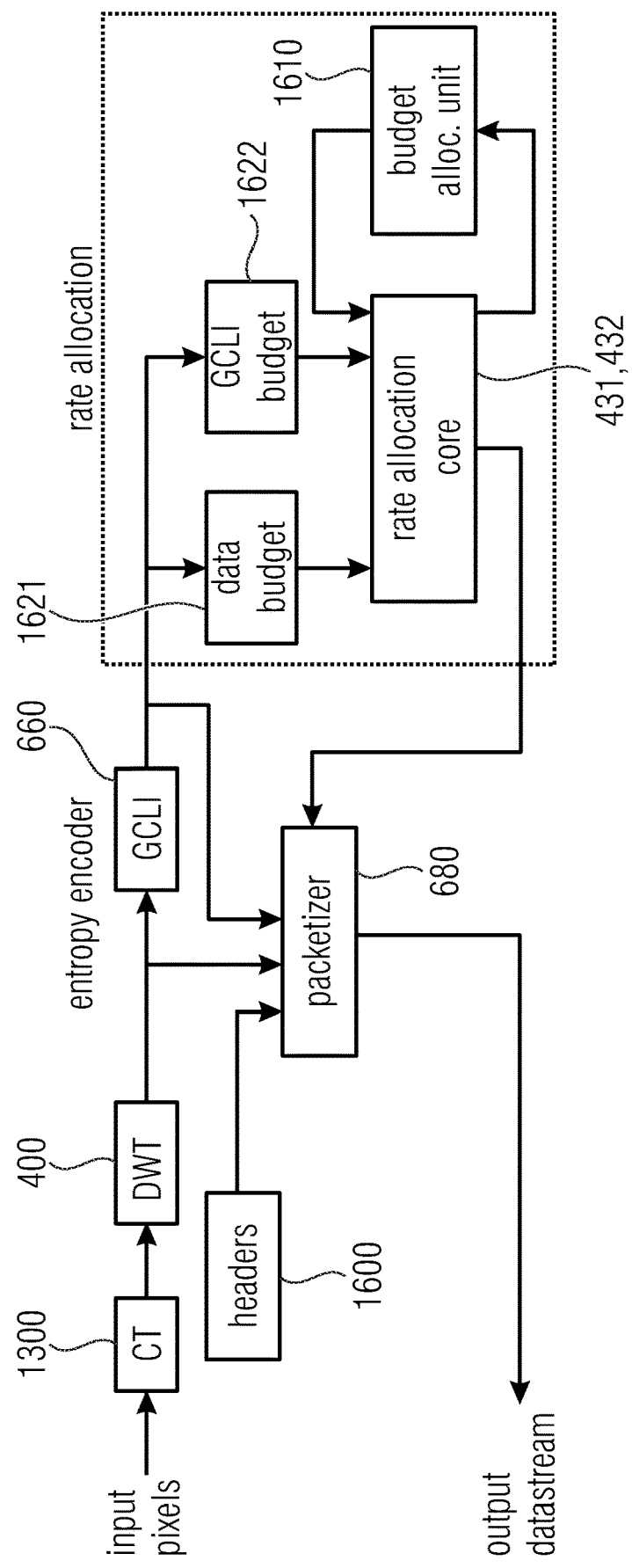
FIG. 16 illustrates a schematic diagram showing the cooperation between the entropy encoder and the rate allocation.

Subsequently, the rate allocation is discussed in more detail. Particularly, FIG. 16 illustrates the cooperation between the entropy encoder on the one hand and the rate allocation on the other, where the rate allocation has a data budget block 1621, a GCLI budget block 1622, a budget allocation unit 1610 and the rate allocation core as discussed before with respect to blocks 431, 432 in FIG. 8c. Furthermore, FIG. 16 also illustrates the usage of headers 1600 that are also packetized by the packetizer 680 into the output data steam as has already been discussed before with respect to header 1104 in FIG. 11.

The rate allocation works precinct per precinct. A precinct groups frequency contents of different subbands forming a same spatial area. Such a spatial area has, for example, a two line height and has the same width as the one of the image. It contains, for the three components, six subbands containing the results of five horizontal decompositions of the low vertical frequency and two subbands containing the result of a single horizontal decomposition of the high vertical frequency.

Rate allocation quantizes precinct data by trimming least significant bit-planes of determined subbands until the remaining bit-planes can fit in the precinct bit-plane's budget. This trimming strategy is applied iteratively, gradually trimming more and more bit-planes in each subband. Based on its use case, one can apply an appropriate "trimming strategy" the trimming strategy determines the importance of subbands relative to each other. The rate allocation chooses to trim more bit-planes in less important subbands than in more important ones. The rate allocation computes the precinct budget for a defined truncation scenario. If the budget does not fit in precinct budget, it computes the budget for a new truncation scenario, removing one more bit-plane in all subbands. Once the precinct size fits in the precinct budget, it computes a possible refinement, re-adding one bit-plane subband per subband in the order defined by a certain priority rule associating different priorities to different subbands until the budget is again exceeded. This results in the final truncation levels for each subband.

The rate allocation quantizes precinct data so that encoded precinct size does not exceed the rate budget. The average precinct budget is in a targeted code stream size divided by the number of image precincts. Advantageously, a rate allocation strategy average is the budget on a couple of precincts to smooth the truncation levels along the image. An encoded coded precinct contains three parts, i.e., the header, the encoded GCLIs and the raw bit-plane's data. The header has a defined size that cannot be adjusted. The rate allocation can reduce the size of raw bit-plane's data part and encoded GCLI part by increasing quantization. The raw bit-plane's budget is the part of the precinct budget available for storing the raw bit-plane's data. A minimum code stream size is able to produce the size of the headers and the encoded GCLIs (raw bit-plane's data size equal to 0).

The calculation of the raw bit-plane data budget for a defined scenario refinement pair uses the GCLIs of the samples which are small four bit numbers. Furthermore, using one GCLI for a group of four samples reduces the amount of numbers to process for the budget calculation by four. Once the size of each group of the precinct is calculated, a sum gives the total data size at a certain iteration. Regarding the GCLIs data budget, there are multiple ways to store the GCLI and the rate allocation will typically compute the budgets for all the methods and choose the most appropriate. As for the data, the budget of the encoded GCLI can be computed based on the output of the (unary) coder 661 illustrated, for example, in FIG. 15. In the raw GCLI case, the budget is the number of groups multiplied by four bits when having up to 16 data bits. Once the size of each coded GCLI of the precinct is calculated, a sum gives the total GCLI's size at a certain iteration.

The rate allocation block in FIG. 16 receives, as an input, the stream of GCLI (data) values, and the block outputs the GTLI information for the packetizer. The data budget block 1621 and the GCLI budget block 1622 compute the used budget to store the data/GCLI for each possible GTLI (from 0 to 15). Advantageously, the quantizer such as the GTLI trimmer 624 or the quantizer 624 in FIG. 8d performs an efficient center-rounding quantization. To this end, a certain quantization step is calculated and a following transform is performed. At the decoder side, a reverse transform consists of applying the quantization step on the data in a certain reverse transform operation. However, other quantizers apart from an efficient center-rounding procedure can be used as well. Then, once the rate allocation block has determined the number of bit-planes to trim in each subband of a precinct, the raw data is read from the raw data buffer 622 of FIG. 8d, quantized and fed to the output stream packet to be packed in the output stream.

On the decoder-side, the GCLI data is decoded prior to data unpacking. This allows applying almost the same process in the reverse way.

4 Literature

[1] AMBROISE RENAUD; BUYSSCHAERT CHARLES; PELLEGRIN PASCAL; ROUVROY GAEL, "Method and Device for Display Stream Compression", U.S. Pat. No. 9,332,258 BB

[2] AMBROISE RENAUD; BUYSSCHAERT CHARLES; PELLEGRIN PASCAL; ROUVROY GAEL, "Method and Device for display stream compression", EP2773122 A1

[3] Jean-Baptiste Lorent, "TICO Lightweight Codec Used in IP Networked or in SDI Infrastructure", SMPTE RDD 35:2016

[4] Toshiaki Kojima, "LLVC—Low Latency Video Codec for Network Transfer", SMPTE RDD 34:2015

[5] J. Kim and C. M. Kyung, "A Lossless Embedded Compression Using Significant Bit Truncation for HD Video Coding", IEEE Transactions on Circuits and Systems for Video Technology, 2010

[6] intoPIX, "intoPIX Codec Submission for JPEG-XS CfP", Design Description v0.1, 2016

[7] intoPIX, "JPEG XS GCLI Bounded code proposal", wg1m76032, Oct 2017

It is to be noted that attached claims related to the apparatus for encoding also apply for the apparatus for decoding where appropriate.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded image signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for encoding image data, the image data being decomposed into a plurality of different subbands, each subband comprising a plurality of coefficients, wherein a first subband of the plurality of different subbands comprises a first set of coefficients, wherein a different second subband of the plurality of different subbands comprises a different second set of coefficients, wherein a precinct comprises the first and the second sets of coefficients from the first and the second subbands of the plurality of different subbands, wherein the first and the second sets of coefficients of the precinct belong to a spatial region of an image represented by the image data, the apparatus comprising:
   a processor for determining, for each group of coefficients within a set, a greatest coded line index (GCLI);
   an encoder for encoding the greatest coded line indices associated with the first set of coefficients of the precinct in accordance with a first encoding mode, and for encoding the greatest coded line indices associated with the second set of coefficients of the precinct in accordance with a second encoding mode, the second encoding mode being different from the first encoding mode; and
   an output interface for outputting an encoded image signal comprising data on the encoded greatest coded line indices and data on the coefficients,
   wherein the first encoding mode and the second encoding mode are selected from a set of encoding modes comprising at least two of: a vertical prediction encoding mode, a horizontal prediction encoding mode, and a raw encoding mode.

2. The apparatus of claim 1, further comprising:
   a mode determiner for determining the first encoding mode and the second encoding mode, the mode determiner being configured for determining the encoding modes for the sets of coefficients based on the corresponding subband, to which a set of coefficients belongs to.

3. The apparatus of claim 1, further comprising a mode determiner for determining the first encoding mode and the second encoding mode, wherein the mode determiner is configured to
   compute a first used data budget for the first set of the precinct using the first encoding mode,
   compute a second used data budget for the first set of the precinct using the second encoding mode,
   select one of the first and the second encoding modes based on the first and the second used data budgets, and
   wherein the output interface is configured to comprise an indication of the encoding mode selected for the first set into the encoded image signal.

4. The apparatus of claim 1, further comprising:
   a quantizer for quantizing the coefficients in the groups in accordance with a greatest trimmed line index (GTLI) for a respective group,
   wherein the data on the coefficients comprises data on quantized coefficients, and wherein the output interface is configured to introduce, into the encoded image signal, data on the greatest trimmed line index for a group.

5. The apparatus of claim 1,
wherein the first encoding mode is a horizontal prediction mode, wherein a prediction is performed between data items related to at least two greatest coded line indices of two horizontally neighbored groups of coefficients,
wherein the second encoding mode is a vertical prediction mode, wherein a prediction is performed between data items related to at least two greatest coded line indices of two vertically neighbored groups of coefficients,
wherein the horizontally neighbored groups of coefficients or the vertically neighbored groups of coefficients refer to corresponding spatial positions of the image signal, which are associated to the coefficients.

6. The apparatus of claim 4, wherein the encoder is configured to determine a data item related to a greatest coded line index using the greatest coded line index for the group of coefficients and a greatest trimmed line index associated with the group of coefficients.

7. The apparatus of claim 4,
wherein a greatest trimmed line index (GTLI) is determined for a group of coefficients indicating a quantization step for the group of coefficients, and
wherein the vertical prediction or the horizontal prediction is based on the following equation:

$$\delta = \begin{cases} \max(GCLI(F_2), GTLI(F_2)) - \max(GCLI(F_1), GTLI(F_2)) & \text{if } GCLI(F_1) > GTLI(F_1) \\ \max(GCLI(F_2), GTLI(F_2)) - GTLI(F_2) & \text{otherwise} \end{cases},$$

wherein $F_1$ and $F_2$ are two horizontally neighbored coefficient groups or are two vertically neighbored coefficients groups, respectively, comprising g>1 coefficients, wherein $F_2$ is the coefficient group to be currently coded, and wherein the greatest coded line index (GCLI) for the coefficient group to be currently coded is signaled by transmitting a δ value, and wherein max ( ) represents a maximum determination function.

8. The apparatus of claim 1,
wherein a greatest trimmed line index is determined for a group of coefficients indicating a quantization step for the group of coefficients, and wherein the one of the first encoding mode and the second encoding mode is a raw encoding mode, wherein the greatest coded line index of a group is encoded using the greatest trimmed line index associated with the group.

9. The apparatus of claim 1,
wherein a greatest trimmed line index is determined for a group of coefficients indicating a quantization step for the group of coefficients, and wherein the greatest trimmed line indices for the precinct are determined on a higher granularity than the greatest coded line indices such as a single greatest trimmed line index for a subband or a single greatest trimmed line index for the precinct.

10. The apparatus of claim 1, wherein the plurality of different subbands comprises
a LH1 subband representing data acquired by high pass filtering the image in the x direction and by low pass filtering the image in the y direction, and
a HL1 subband comprising image data acquired by low pass filtering the image in the x direction and high pass filtering the image in the y direction, wherein an encoding mode associated to the HL1 subband is a horizontal prediction encoding mode, and
wherein the encoding mode associated with the LH1 subband is the vertical prediction encoding mode.

11. The apparatus of claim 1, wherein the plurality of different subbands comprises a HH1 subband representing image data acquired by high pass filtering the image in accordance with the x direction and high pass filtering the image in accordance with the y direction; and
wherein the encoding mode associated with the HH1 subband is the vertical prediction encoding mode.

12. The apparatus of claim 1, wherein the plurality of different subbands comprises:
a LH2 subband comprising data acquired by filtering using a high pass filter in the x direction and using a low pass filter in the y direction,
a HL2 subband acquired by filtering using a low pass filter in the x direction and a high pass filter in the y direction,
wherein the encoding mode associated with the HL2 subband is the horizontal prediction encoding mode, and wherein the encoding mode associated with the LH2 subband is the vertical prediction encoding mode.

13. The apparatus of claim 1, wherein the plurality of different subbands comprise:
a HH2 subband comprising data acquired by filtering using a high pass filter in accordance with the x direction and using a high pass filter in the y direction; and wherein the encoding mode associated with the HH2 subband is the vertical prediction encoding mode.

14. The apparatus of claim 1, wherein the plurality of subbands comprise:
a H3 subband acquired by filtering using a high pass filter in the x direction;
a H4 subband acquired by using a high pass filter in the x direction; and
a L5 subband using a low pass filter in the x direction, and
wherein the encoding mode associated with the H3 subband, associated with the H4 subband, or associated with the L5 subband is the vertical prediction encoding mode.

15. The apparatus of claim 1, wherein the encoder comprises, for each subband,
a budget computation facility, wherein the budget computation facility is configured to calculate for the subband and each possible truncation point (GTLI) and each encoding mode a used data budget for the subband of the precinct; and
an encoding mode selector for selecting, for each subband, the encoding mode with the smallest resulting data budget or for selecting, for each subband, the encoding mode using a heuristic based on previous data; and
a rate controller for combining available rate information and selecting a truncation point for each subband; and
the output interface being configured for generating the data on the coefficients using the selected truncation point, wherein the data on the encoded greatest coded line indices comprise the data for the selected truncation point and the selected encoding mode.

16. The apparatus of claim 15,
wherein the output interface is configured to include into the encoded image signal a signaling information for signaling, for each subband, the selected encoding mode.

17. The apparatus of claim 15,
wherein the encoder is configured to apply the budget computation facility and the encoding mode selector for a first subgroup of all subbands in the precinct, wherein the encoding modes for a second subgroup of the subbands of the precinct, which is different from the first subgroup for the precinct are predetermined.

18. The apparatus of claim 1,
wherein the encoder is configured for using an entropy encoder or an encoding using a variable length code with a code table or a dynamically created code book or an unary code in the first encoding mode and/or the second encoding mode.

19. The apparatus of claim 1,
wherein two sets of coefficients of a further precinct belong to a further spatial region of the image, the further spatial region being different from the spatial region, and
wherein the encoder is configured for encoding the greatest coded line indices associated with a first set of the further precinct in accordance with the first encoding mode, and for encoding the greatest coded line indices associated with a second set of the further precinct in accordance with the second encoding mode, the second encoding mode being different from the first encoding mode.

20. The apparatus of claim 2, wherein the mode determiner comprises:
a subband budget calculator for calculating, for a precinct, a first plurality of data budgets for encoding the first set of coefficients for a first subband using different truncation points and different encoding modes and a second plurality of data budgets for a second set of coefficients for a second subband using different truncation points and different encoding modes;
a prediction mode selector for selecting, for the first set of coefficients, a first encoding mode comprising a data budget for the first plurality of data budgets matching a target for each truncation point and, for the second set of coefficients, a second encoding mode comprising a data budget from the second plurality of data budgets matching a target for each truncation point, to acquire a selected encoding mode for each set of coefficients.

21. The apparatus of claim 20, wherein the mode determiner comprises:
a budget combiner for combining, for each truncation point, a first data budget for the first set of coefficients associated with a selected encoding mode for the first set of coefficients and a second data budget for the second set of coefficients associated with the selected encoding mode for the second set of coefficients to acquire a combined budget for each truncation point; and
a truncation point selector for selecting a truncation point associated with a combined budget conforming with a budget target.

22. The apparatus of claim 1, wherein the precinct or any additional precinct comprises, in addition to the first set of coefficients and the second set of coefficients, one or more additional sets of coefficients,
wherein the encoder is configured for encoding the greatest coded line indices associated with the one of more additional sets of coefficients in accordance with the first encoding mode or in accordance with the second encoding mode, or in accordance with a third encoding mode being different from the first encoding mode and the second encoding mode; and
wherein the output interface is configured for outputting the encoded image signal comprising data on the encoded greatest coded line indices associated with the one or more additional sets of coefficients and data on the one or more additional sets of coefficients and an indication of the encoding mode selected for the one or more additional sets of coefficients.

23. An apparatus for decoding an encoded image signal comprising data on encoded greatest coded line indices and data on coefficients, comprising:
a decoding mode determiner for determining different decoding modes for the data on the encoded greatest coded line indices for different subbands within a precinct, wherein the data on the coefficients represent image data being decomposed into a plurality of different subbands, each subband comprising a plurality of coefficients, wherein the precinct comprises different sets of coefficients from different subbands, wherein two sets of coefficients of a precinct belong to a spatial region of an image represented by the image data; and
a decoder for decoding the data on the encoded greatest coded line indices for the first set in the precinct using the first decoding mode and for decoding the data on the encoded greatest coded line indices for the second set in the precinct using a second decoding mode as determined by the decoding mode determiner, and for decoding the data on the coefficients using decoded greatest coded line index data,
wherein the first decoding mode and the second decoding mode are selected from a group of decoding modes comprising at least two of a vertical inverse prediction decoding mode, a horizontal inverse prediction decoding mode, and a raw decoding mode.

24. The apparatus of claim 23,
wherein the encoded image signal comprises, as signaling information, a decoding mode information for at least for two different subbands of the precinct, and
wherein the decoding mode determiner is configured for determining the decoding mode by extracting the decoding mode information from the encoded image signal and by interpreting the extracted decoded mode information for each of at least two different subbands for the precinct.

25. The apparatus of claim 23,
wherein the decoding mode determiner is configured to determine the decoding mode by selecting the decoding mode in accordance with the subband, which the group of coefficients of the set belongs to, wherein each of the plurality of different subbands has associated therewith a predetermined decoding mode, and wherein, within the precinct, two different subbands have associated therewith two different decoding modes.

26. The apparatus of claim 23,
wherein the decoder further comprises a dequantizer for dequantizing the coefficients in each group in accordance with the greatest trimmed line index (GTLI) for a respective group, wherein the data on the greatest trimmed line index for the precinct is comprised in the encoded image signal.

27. The apparatus of claim 23:
wherein the first decoding mode is a horizontal inverse prediction decoding mode, wherein the inverse prediction is performed using a transmitted data item and a previously decoded greatest coded line index, where the data items and the previously decoded greatest coded line index are associated with two horizontally neighbored groups of coefficients, and
wherein the second decoding mode is a vertical inverse prediction decoding mode, wherein the inverse prediction is performed between a transmitted data item and a previously decoded greatest coded line index, wherein the data item and the previously decoded greatest coded line index are associated with two vertically neighbored groups of coefficients.

28. The apparatus of claim 23,
wherein a greatest trimmed line index is extracted from the encoded image signal for a group of coefficients, the greatest trimmed line index indicating a quantization step for the group of coefficients, and wherein the vertical or horizontal inverse prediction is performed based on the following equation:

$$GCLI'(F_2) = \delta + \begin{cases} \max(GCLI(F_1), GTLI(F_2)) & \text{if } GCLI(F_1) > GTLI(F_1) \\ GTLI(F_2) & \text{otherwise} \end{cases}$$

$$GCLI(F_2) = \begin{cases} GCLI'(F_2) & \text{if } GCLI'(F_2) > GTLI(F_2) \\ 0 & \text{otherwise} \end{cases},$$

wherein $\delta$ is the transmitted data item, $F_1$ and $F_2$ are two horizontally neighbored coefficients groups, comprising g>1 coefficients, and wherein max stands for a maximum operation, and wherein $GCLI(F_2)$ represents a currently decoded data item.

29. The apparatus of claim 23,
wherein a greatest trimmed line index is comprised in the encoded image signal, and wherein the greatest trimmed line index for the group of coefficients is given on a higher granularity than the greatest coded line index data such as a single greatest trimmed line index for a subband or a single greatest trimmed line index for the precinct.

30. The apparatus of claim 23, wherein the plurality of different subbands comprises
a LH1 subband representing data acquired by high pass filtering the image in the x direction and by low pass filtering the image in the y direction, and
a HL1 subband comprising image data acquired by low pass filtering the image in the x direction and high pass filtering the image in the y direction,
wherein a decoding mode associated to the HL1 subband is a horizontal inverse prediction decoding mode, and
wherein the decoding mode associated with the LH1 subband is the vertical inverse prediction decoding mode.

31. The apparatus of claim 23, wherein the plurality of different subbands comprises
a HH1 subband representing image data acquired by high pass filtering the image in accordance with the x direction and high pass filtering the image in accordance with the y direction, wherein the decoding mode associated with the HH1 subband is the vertical inverse prediction decoding mode.

32. The apparatus of claim 23, wherein the plurality of different subbands comprise:
a LH2 subband comprising data acquired by filtering using a high pass filter in the x direction and using a low pass filter in the y direction, and
HL2 subband acquired by filtering using a low pass filter in the x direction and a high pass filter in the y direction,
wherein the decoding mode associated with the HL2 subband is the horizontal inverse prediction decoding mode, and wherein the decoding mode associated with the LH2 subband is the vertical inverse prediction decoding mode.

33. The apparatus of claim 23, wherein the plurality of different subbands comprises a HH2 subband comprising data acquired by filtering using a high pass filter in accordance with the x direction and using a high pass filter in the y direction; and wherein the decoding mode associated with the HH2 subband is the vertical inverse prediction decoding mode.

34. The apparatus of claim 23, wherein the plurality of subbands comprise:
a H3 subband acquired by filtering using a high pass filter in the x direction;
a H4 subband acquired by using a high pass filter in the x direction; and
a L5 subband using a low pass filter in the x direction, and
wherein the decoding mode associated with the H3 subband, associated with the H4 subband, or associated with the L5 subband is the vertical inverse prediction decoding mode.

35. The apparatus of claim 23,
wherein the encoded image signal comprises the signaling information only for a subgroup of subbands for the precinct, and
wherein the decoding mode determiner is configured to determine the decoding mode for the subband of the first subgroup based on the signaling information and to determine the decoding mode for subbands in the precinct other than the first subgroup using decoding modes for the subbands as available in the apparatus for decoding.

36. The apparatus of claim 23, wherein two sets of coefficients of a further precinct belong to a further spatial region of the image, the further spatial region being different from the spatial region, and
wherein the decoder is configured for decoding the data on the encoded greatest coded line indices for the first set in a further precinct using the first decoding mode and for decoding the data on the encoded greatest coded line indices for the second set in the further precinct using a second decoding mode as determined by the decoding mode determiner, and for decoding the data on the coefficients using decoded greatest coded line index data.

37. The apparatus of claim 23, wherein the decoding mode determiner is configured for determining one or more decoding modes for the data on the encoded greatest coded line indices for one or more additional sets of coefficients in addition to the first and the second sets of coefficients of the precinct or one or more additional precincts, wherein the greatest coded line indices associated with the one of more additional sets of coefficients are encoded in accordance with the first encoding mode or in accordance with the second encoding mode, or in accordance with a third encoding mode being different from the first encoding mode and the second encoding mode; and
wherein the a decoder is configured for decoding the data on the encoded greatest coded line indices for the one or more additional sets of coefficients in the precinct or on the one or more additional precinct using the one or more decoding modes and for decoding the data on the coefficients in the one or more additional sets of coefficients using decoded greatest coded line index data for the one or more additional sets of coefficients.

38. A method for encoding image data, the image data being decomposed into a plurality of different subbands, each subband comprising a plurality of coefficients, wherein a first subband of the plurality of different subbands comprises a first set of coefficients, wherein a different second subband of the plurality of different subbands comprises a different second set of coefficients, wherein a precinct comprises the first and the second sets of coefficients from the first and the second subbands of the plurality of different subbands, wherein the first and the second sets of coefficients of the precinct belong to a spatial region of an image represented by the image data, the method comprising:
   determining, for each group of coefficients within a set, a greatest coded line index (GCLI);
   encoding the greatest coded line indices associated with the first set of coefficients of the precinct in accordance with a first encoding mode, and encoding the greatest coded line indices associated with the second set of coefficients of the precinct in accordance with a second encoding mode, the second encoding mode being different from the first encoding mode; and
   outputting or storing an encoded image signal comprising data on the encoded greatest coded line indices and data on the coefficients,
   wherein the first encoding mode and the second encoding mode are selected from a set of encoding modes comprising at least two of: a vertical prediction encoding mode, a horizontal prediction encoding mode, and a raw encoding mode.

39. A method for decoding an encoded image signal comprising data on encoded greatest coded line indices and data on coefficients, comprising:
   determining different decoding modes for the data on the encoded greatest coded line indices for different subbands within a precinct, wherein the data on the coefficients represent image data being decomposed into a plurality of different subbands, each subband comprising a plurality of coefficients, wherein the precinct comprises different sets of coefficients from different subbands, wherein two sets of coefficients of a precinct belong to a spatial region of an image represented by the image data; and
   decoding the data on the encoded greatest coded line indices for the first set in the precinct using the first decoding mode and decoding the data on the encoded greatest coded line indices for the second set in the precinct using a second decoding mode as determined by the determining the different decoding modes, and decoding the data on the coefficients using decoded greatest coded line index data,
   wherein the first decoding mode and the second decoding mode are selected from a group of decoding modes comprising at least two of a vertical inverse prediction decoding mode, a horizontal inverse prediction decoding mode, and a raw decoding mode.

40. An encoded image signal comprising data on encoded greatest coded line indices, data on coefficients representing image data being decomposed into a plurality of different subbands, each subband comprising a plurality of coefficients, wherein a first subband of the plurality of different subbands comprises a first set of coefficients, wherein a different second subband of the plurality of different subbands comprises a different second set of coefficients, wherein a precinct comprises the first and the second sets of coefficients from the first and the second subbands of the plurality of different subbands, wherein the first and the second sets of coefficients of the precinct belong to a spatial region of an image represented by the encoded image signal, and signaling information for signaling two different decoding modes for at least two different subbands of the precinct, wherein the first decoding mode and the second decoding mode are selected from a group of decoding modes comprising at least two of a vertical inverse prediction decoding mode, a horizontal inverse prediction decoding mode, and a raw decoding mode.

41. A non-transitory digital storage medium having stored thereon a computer program for performing a method for encoding image data, the image data being decomposed into a plurality of different subbands, each subband comprising a plurality of coefficients, wherein a first subband of the plurality of different subbands comprises a first set of coefficients, wherein a different second subband of the plurality of different subbands comprises a different second set of coefficients, wherein a precinct comprises the first and the second sets of coefficients from the first and the second subbands of the plurality of different subbands, wherein the first and the second sets of coefficients of the precinct belong to a spatial region of an image represented by the image data, the method comprising:
   determining, for each group of coefficients within a set, a greatest coded line index (GCLI);
   encoding the greatest coded line indices associated with the first set of coefficients of the precinct in accordance with a first encoding mode, and encoding the greatest coded line indices associated with the second set of coefficients of the precinct in accordance with a second encoding mode, the second encoding mode being different from the first encoding mode; and
   outputting or storing an encoded image signal comprising data on the encoded greatest coded line indices and data on the coefficients,
   wherein the first encoding mode and the second encoding mode are selected from a set of encoding modes comprising at least two of: a vertical prediction encoding mode, a horizontal prediction encoding mode, and a raw encoding mode,
   when said computer program is run by a computer.

42. A non-transitory digital storage medium having stored thereon a computer program for performing a method for decoding an encoded image signal comprising data on encoded greatest coded line indices and data on coefficients, comprising:
   determining different decoding modes for the data on the encoded greatest coded line indices for different subbands within a precinct, wherein the data on the coefficients represent image data being decomposed into a plurality of different subbands, each subband comprising a plurality of coefficients, wherein the precinct comprises different sets of coefficients from different subbands, wherein two sets of coefficients of a precinct belong to a spatial region of an image represented by the image data; and
   decoding the data on the encoded greatest coded line indices for the first set in the precinct using the first decoding mode and decoding the data on the encoded greatest coded line indices for the second set in the precinct using a second decoding mode as determined by the determining the different decoding modes, and decoding the data on the coefficients using decoded greatest coded line index data, wherein the first decoding mode and the second decoding mode are selected from a group of decoding modes comprising at least two of a vertical inverse prediction decoding mode, a horizontal inverse prediction decoding mode, and a raw decoding mode, when said computer program is run by a computer.

* * * * *